United States Patent

Kaku et al.

[11] Patent Number: 6,002,712
[45] Date of Patent: *Dec. 14, 1999

[54] TIMING PHASE CONTROL APPARATUS AND TIMING PHASE CONTROL METHOD

[75] Inventors: Takashi Kaku; Noboru Kawada; Hideo Miyazawa, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/898,493

[22] Filed: Jul. 22, 1997

[30] Foreign Application Priority Data

Feb. 12, 1997 [JP] Japan ..................... 9-028207

[51] Int. Cl.$^6$ ............... H04B 1/38; H03K 5/159
[52] U.S. Cl. ................. 375/222; 375/231; 375/232
[58] Field of Search ................... 375/222, 232, 375/231, 229, 362, 371, 375, 373

[56] References Cited

U.S. PATENT DOCUMENTS 4,694,469  9/1987  Kaku et al. ..................... 375/231
4,847,880  7/1989  Kamerman et al. ............... 375/222
5,247,541  9/1993  Nakai ........................... 375/233

*Primary Examiner*—Stephen Chin
*Assistant Examiner*—Albert Park
*Attorney, Agent, or Firm*—Armstrong, Westerman, Hattori, McLeland & Naughton

[57] ABSTRACT

The present invention discloses a timing phase control apparatus which is particularly suitable for use in a modem used for very high speed data transmission employing a metallic line. The timing phase control apparatus includes a timing phase extracting portion to extract timing phase information from an input signal, a timing phase control filter portion to make a timing phase control to the input signal depending upon the timing phase information from the timing phase extracting portion through filter processing using a coefficient operation having a preset impulse response characteristic, and a filter processing coefficient determining portion to determine a coefficient used for the filter processing in the timing phase control filter portion depending upon the timing phase information and information about an approximate expression of the impulse response characteristic. An accuracy of a tap coefficient can be improved while reducing an amount of information about the tap coefficient, which should be stored.

10 Claims, 25 Drawing Sheets

| FIG.5A |
| FIG.5B |
| FIG.5C |

FIG. 7

OPERATIONS OF TMCA COUNTER

| TMCA VALUE | TMCA HEX | TMCA 7 HIGH ORDER BITS / 2 | | | AUTOMATIC JUMP METHOD |
|---|---|---|---|---|---|
| +2.00 | [7 1111 FF] | JP7E | 0.984375 | ------ | |
| +0.03125 | [0 0010 00] | JP02 | 0.015625 | -360° | ADD HALF OF 7 HIGH ORDER BITS, 0.015625 OR 0.0 EVERY TIME |
| +0.03124 | [0 0001 FF] | -- 0 | 0.000 | -359° | |
| +0.015625 | [0 0001 00] | -- 0 | 0.000 | 0° | ADD HALF OF 7 HIGH ORDER BITS, 0.015625 OR 0.0 EVERY TIME |
| +0.00 | [0 0000 00] | -- 0 | 0.000 | +359° | |
| -0.00 | [F 1111 FF] | JPFE | -0.015625 | +360° | |
| -2.00 | [8 0000 00] | JP 8 | -1.000 | ------ | |

FIG. 8

OPERATIONS OF TMCA COUNTER

| TMCA VALUE | TMCC HEX | TMCA 2 HIGH ORDER BITS / 2 | | | AUTOMATIC JUMP METHOD |
|---|---|---|---|---|---|
| +2.00 | [0111 FFF] | JP 01 | 0.50 | ------ | |
| +1.002 | [0100 020] | JP 01 | 0.50 | ------ | |
| +1.00 | [0100 000] | JP 01 | 0.50 | -360° | ADD HALF OF 2 HIGH ORDER BITS, 0.50 OR 0.0 EVERY TIME |
| +0.99 | [0011 FFF] | -- 00 | 0.00 | -359° | |
| +0.75 | [0011 000] | -- 00 | 0.00 | -180° | |
| +0.502 | [0010 020] | -- 00 | 0.00 | -1.4° | |
| +0.50 | [0010 000] | -- 00 | 0.00 | 0° | |
| +0.498 | [0001 FDF] | -- 00 | 0.00 | +1.4° | |
| +0.25 | [0001 000] | -- 00 | 0.00 | +180° | ADD HALF OF 2 HIGH ORDER BITS, -0.50 OR 0.0 EVERY TIME |
| +0.00 | [0000 000] | -- 00 | 0.00 | +359° | |
| -0.00 | [1111 FFF] | JP 11 | -0.50 | +360° | |
| -0.002 | [1111 FDF] | JP 11 | -0.50 | ------ | |
| -0.99 | [1100 001] | JP 11 | -0.50 | ------ | |
| -1.00 | [1100 000] | JP 11 | -0.50 | ------ | |
| -2.00 | [1000 000] | JP 10 | -1.00 | ------ | |

FIG.11

| AREA | ADDRESS | EXPRESSION (ax+b) | a | b |
|---|---|---|---|---|
| 0 ∫ 1 | 0000 ∫ 0001 | -0.326923005x + 0.0<br>x=0 ~ 0.003920611 | EB14 | 0000 |
| 2 ∫ 3 | 0002 ∫ 0003 | -0.311355279x - 0.000091553<br>x=0.007841222 ~ 0.011761833 | EC13 | FFFE |
| 4 ∫ 7 | 0004 ∫ 0007 | -0.281517074x - 0.000513713<br>x=0.015682444 ~ 0.027444278 | EDFC | FFF8 |
| 8 ∫ 11 | 0008 ∫ 000B | -0.246489628x - 0.001546224<br>x=0.031364889 ~ 0.043126723 | F03A | FFE7 |
| 12 ∫ 15 | 000C ∫ 000F | -0.214056760x - 0.003005982<br>x=0.047047334 ~ 0.058809168 | F24D | FFCF |
| 16 ∫ 19 | 0010 ∫ 0013 | -0.180326645x - 0.005045571<br>x=0.062729779 ~ 0.074491613 | F476 | FFAD |
| 20 ∫ 23 | 0014 ∫ 0017 | -0.150488440x - 0.007334387<br>x=0.078412224 ~ 0.090174057 | F65E | FF88 |
| 24 ∫ 31 | 0018 ∫ 001F | -0.106769248x - 0.011422181<br>x=0.094094669 ~ 0.121538947 | F92B | FF45 |
| 32 ∫ 39 | 0020 ∫ 0027 | -0.057823126x - 0.017464774<br>x=0.125459558 ~ 0.152903837 | FC4D | FEE2 |
| 40 ∫ 47 | 0028 ∫ 002F | -0.014455799x - 0.024176458<br>x=0.156824448 ~ 0.184268727 | FF13 | FE74 |
| 48 ∫ 55 | 0030 ∫ 0037 | 0.021683645x - 0.030890322<br>x=0.188189338 ~ 0.215633616 | 0163 | FE06 |
| 56 ∫ 63 | 0038 ∫ 003F | 0.051151244x - 0.037292484<br>x=0.219554227 ~ 0.246998506 | 0346 | FD9D |

| AREA | ADDRESS | EXPRESSION (ax+b) | a | b |
|---|---|---|---|---|
| 64 ∫ 71 | 0040 ∫ 0047 | 0.073946888x - 0.042953492<br>x=0.250919117 ~ 0.278363396 | 04BC | FD40 |
| 72 ∫ 79 | 0048 ∫ 004F | 0.090626612x - 0.047631393<br>x=0.282284007 ~ 0.309728285 | 05CD | FCF4 |
| 80 ∫ 95 | 0050 ∫ 005F | 0.104044576x - 0.051813764<br>x=0.313648897 ~ 0.372458065 | 06A9 | FCAF |
| 96 ∫ 111 | 0060 ∫ 006F | 0.106379722x - 0.052673336<br>x=0.376378676 ~ 0.435187844 | 06CF | FCA1 |
| 112 ∫ 119 | 0070 ∫ 0077 | 0.098410493x - 0.049194325<br>x=0.439108455 ~ 0.466552734 | 064C | FCDA |
| 120 ∫ 123 | 0078 ∫ 007B | 0.092109277x - 0.046249389<br>x=0.470473345 ~ 0.482235179 | 05E5 | FD0A |
| 124 ∫ 127 | 007C ∫ 007F | 0.086920035x - 0.043736781<br>x=0.48615579 ~ 0.497917624 | 0590 | FD33 |
| 128 ∫ 129 | 0080 ∫ 0081 | 0.081730623x - 0.041137622<br>x=0.501838235 ~ 0.505758846 | 053B | FD5E |
| 130 ∫ 131 | 0082 ∫ 0083 | 0.077838883x - 0.039154081<br>x=0.509679457 ~ 0.513600068 | 04FB | FD7E |
| 132 ∫ 135 | 0084 ∫ 0087 | 0.075244220x - 0.037796031<br>x=0.51752068 ~ 0.529282513 | 04D1 | FD95 |
| 136 ∫ 139 | 0088 ∫ 008B | 0.068757646x - 0.034357715<br>x=0.533203125 ~ 0.544964958 | 0467 | FDCD |
| 140 ∫ 143 | 008C ∫ 008F | 0.063568404x - 0.031519588<br>x=0.548885569 ~ 0.560647403 | 0412 | FDFC |

| AREA | ADDRESS | EXPRESSION (ax+b) | a | b |
|---|---|---|---|---|
| 144 ∫ 147 | 0090 ∫ 0093 | -0.055784499x + 0.027145389<br>x=0.564568014 ~ 0576329848 | 0392 | FE43 |
| 148 ∫ 151 | 0094 ∫ 0097 | 0.048000593x - 0.02263386<br>x=0.580250459 ~ 0.592012293 | 0312 | FE8D |
| 152 ∫ 159 | 0098 ∫ 009F | 0.039475404x - 0.017558505<br>x=0.595932904 ~ 0.623377182 | 0287 | FEE0 |
| 160 ∫ 167 | 00A0 ∫ 00A7 | 0.025575604x - 0.008871889<br>x=0.627297794 ~ 0.654742072 | 01A3 | FF6F |
| 168 ∫ 175 | 00A8 ∫ 00AF | 0.013343801x - 0.000839235<br>x=0.658662683 ~ 0.686106962 | 00DB | FFF2 |
| 176 ∫ 183 | 00B0 ∫ 00B7 | 0.001667961x + 0.007180359<br>x=0.690027573 ~ 0.717471852 | 001B | 0076 |
| 184 ∫ 191 | 00B8 ∫ 00BF | -0.008895843x + 0.01477921<br>x=0.717471852 ~ 0.748836741 | FF6E | 00F2 |
| 192 ∫ 199 | 00C0 ∫ 00C7 | -0.017791722x + 0.02144949<br>x=0.752757352 ~ 0.780201631 | FEDD | 015F |
| 200 ∫ 207 | 00C8 ∫ 00CF | -0.025575640x + 0.027531235<br>x=0.784122242 ~ 0.811566521 | FE5D | 01C3 |
| 208 ∫ 223 | 00D0 ∫ 00DF | -0.032951766x + 0.033539832<br>x=0.815487132 ~ 0.8742963 | FDE4 | 0226 |
| 224 ∫ 239 | 00E0 ∫ 00EF | -0.037362643x + 0.037405401<br>x=0.878216911 ~ 0.93702608 | FD9C | 0265 |
| 240 ∫ 247 | 00F0 ∫ 00F7 | -0.036695444x + 0.036771499<br>x=0.940946691 ~ 0.968390969 | FDA7 | 025A |
| 248 ∫ 253 | 00F8 ∫ 00FD | -0.035027446x + 0.035140966<br>x=0.97231158 ~ 0.984073414 | FDC2 | 0240 |
| 254 ∫ 255 | 00FE ∫ 00FF | -0.031135451x + 0.031265179<br>x=0.995835248 ~ 0.999755859 | FE02 | 0200 |

| AREA | ADDRESS | EXPRESSION (ax+b) | a | b |
|---|---|---|---|---|
| 0 ∫ 31 | 0000 ∫ 001F | -0.306333449x + 1.0<br>x=0 ~ 0.121538947 | EC65 | 4000 |
| 32 ∫ 63 | 0020 ∫ 003F | -0.880834219x + 1.070881998<br>x=0.125459558 ~ 0.246998506 | C7A0 | 4489 |
| 64 ∫ 95 | 0040 ∫ 005F | -1.29325446x + 1.173424997<br>x=0.250919117 ~ 0.372458065 | AD3B | 4B19 |
| 96 ∫ 127 | 0060 ∫ 007F | -1.481323111x + 1.2436804<br>x=0.376378676 ~ 0.497917624 | A132 | 4F98 |
| 128 ∫ 159 | 0080 ∫ 009F | -1.436503018x + 1.22113628<br>x=0.501838235 ~ 0.623377182 | A410 | 4E27 |
| 160 ∫ 175 | 00A0 ∫ 00AF | -1.279670319x + 1.123107903<br>x=0.627297794 ~ 0.686106962 | AE1A | 47E1 |
| 176 ∫ 191 | 00B0 ∫ 00BF | -1.127625148x + 1.018479408<br>x=0.690027573 ~ 0.748836741 | B7D5 | 412F |
| 192 ∫ 207 | 00C0 ∫ 00CF | -0.954304026x + 0.888342282<br>x=0.752757352 ~ 0.811566521 | C2ED | 38DB |
| 208 ∫ 215 | 00D0 ∫ 00DF | -0.817307695x + 0.776977541<br>x=0.815487132 ~ 0.84293141 | CBB1 | 31BA |
| 216 ∫ 223 | 00E0 ∫ 00EF | -0.724457085x + 0.69852992<br>x=0.846852022 ~ 0.8742963 | D1A2 | 2CB5 |
| 224 ∫ 231 | 00F0 ∫ 00E7 | -0.633274436x + 0.618621802<br>x=0.878216911 ~ 0.90566119 | D778 | 2798 |
| 232 ∫ 239 | 00E8 ∫ 00EF | -0.544315821x + 0.53788541<br>x=0.909581801 ~ 0.93702608 | DD2A | 226D |

| AREA | ADD-RESS | EXPRESSION (ax+b) | a | b |
|---|---|---|---|---|
| 240 ∫ 243 | 00F0 ∫ 00F3 | -0.478708777x + 0.476318346<br>x=0.940946691~0.952708524 | E15D | 1E7C |
| 244 ∫ 247 | 00F4 ∫ 00F7 | -0.437194757x + 0.436681118<br>x=0.956629136~0.968390969 | E405 | 1BF3 |
| 248 ∫ 251 | 00F8 ∫ 00FB | -0.396978068x + 0.397659347<br>x=0.97231158 ~0.984073414 | E698 | 1973 |
| 252 ∫ 253 | 00FC ∫ 00FD | -0.365842702x + 0.366974086<br>x=0.987994025~0.991914636 | E896 | 177D |
| 254 ∫ 255 | 00FE ∫ 00FF | -0.346382726x + 0.347625675<br>x=0.995835248~0.999755859 | E9D5 | 163F |

| AREA | ADDRESS | EXPRESSION (ax+b) | a | b |
|---|---|---|---|---|
| 0 ∫ 1 | 0000 ∫ 0001 | 0.338598990x + 0.0<br>x=0 ~ 0.003920611 | 15AC | 0000 |
| 2 ∫ 3 | 0002 ∫ 0003 | 0.358058456x - 0.000122069<br>x=0.007841222 ~ 0.011761833 | 16EA | FFFE |
| 4 ∫ 7 | 0004 ∫ 0007 | 0.386599499x - 0.000539143<br>x=0.015682444 ~ 0.027444278 | 18BE | FFF7 |
| 8 ∫ 11 | 0008 ∫ 000B | 0.426816188x - 0.001714068<br>x=0.031364889 ~ 0.043126723 | 1B51 | FFE4 |
| 12 ∫ 15 | 000C ∫ 000F | 0.468331653x - 0.003585896<br>x=0.047047334 ~ 0.058809168 | 1DF9 | FFC5 |
| 16 ∫ 23 | 0010 ∫ 0017 | 0.533195981x - 0.00756836<br>x=0.062729779 ~ 0.090174057 | 2220 | FF84 |
| 24 ∫ 31 | 0018 ∫ 001F | 0.622154596x - 0.015755785<br>x=0.094094669 ~ 0.121538947 | 27D1 | FEFE |
| 32 ∫ 39 | 0020 ∫ 0027 | 0.713337281x - 0.027025498<br>x=0.125459558 ~0.152903837 | 2DA7 | FE45 |
| 40 ∫ 47 | 0028 ∫ 002F | 0.805631855x -0.041320798<br>x=0.156824448 ~ 0.184268727 | 338F | FD5B |
| 48 ∫ 63 | 0030 ∫ 003F | 0.942887660x - 0.066967771<br>x=0.188189338 ~ 0.246998506 | 3C58 | FBB7 |
| 64 ∫ 79 | 0040 ∫ 004F | 1.117246647x - 0.110355632<br>x=0.250919117 ~ 0.309728285 | 4781 | F8F0 |
| 80 ∫ 95 | 0050 ∫ 005F | 1.270848599x - 0.158213298<br>x=0.313648897 ~ 0.372458065 | 5156 | F5E0 |

| AREA | ADDRESS | EXPRESSION (ax+b) | a | b |
|---|---|---|---|---|
| 96 ⟨ 127 | 0060 ⟨ 007F | 1.431857791x − 0.218547205<br>x=0.376378676∼0.497917624 | 5BA4 | F203 |
| 128 ⟨ 159 | 0080 ⟨ 009F | 1.483331850x − 0.244148497<br>x=0.501838235∼0.623377182 | 5EEF | F060 |
| 160 ⟨ 191 | 00A0 ⟨ 00BF | 1.302795994x − 0.131099084<br>x=0.627297794∼0.748836741 | 5361 | F79C |
| 192 ⟨ 223 | 00C0 ⟨ 00DF | 0.896527534x + 0.174055035<br>x=0.752757352∼0.8742963 | 3961 | 0B24 |
| 224 ⟨ 255 | 00E0 ⟨ 00FF | 0.325667613x + 0.674366119<br>x=0.878216911∼0.999755859 | 14D8 | 2B29 |

| INPUT | PHAD CONTROL | | 14 BITS | 2 HIGH ORDER BITS | | | | 12 LOW ORDER BITS | | REMARKS |
|---|---|---|---|---|---|---|---|---|---|---|
| | | | | VALUE | CENTER POSITION | AMOUNT OF PHASE SHIFT | | HEX VALUE | AMOUNT OF PHASE SHIFT | |
| +360° | −360° | +0.999 | [3FFF] | 3 | ■■■ / □□□ / □□□ | −180° | | [0FFF] | −180° | |
| +270° | −270° | +0.875 | [3800] | 3 | | −180° | | [0800] | −90° | |
| +181° | −181° | +0.75 | [3000] | 3 | | −180° | | [0000] | 0° | |
| +180° | −180° | +0.749 | [2FFF] | 2 | □□□ / ■■■ / □□□ | 0° | | [0FFF] | −180° | |
| +90° | −90° | +0.625 | [2800] | 2 | | 0° | | [0800] | −90° | |
| +0° | −0° | +0.50 | [2000] | 2 | | 0° | | [0000] | 0° | |
| −0° | +0° | +0.499 | [1FFF] | 1 | □□□ / □□□ / ■■■ | +180° | | [0FFF] | −180° | |
| −90° | +90° | +0.375 | [1800] | 1 | | +180° | | [0800] | −90° | |
| −180° | +180° | +0.25 | [1000] | 1 | | +180° | | [0000] | 0° | |
| −181° | +181° | +0.249 | [0FFF] | 0 | □□□ / □□□ / □□□ (with bottom row ■■■) | +360° | | [0FFF] | −180° | |
| −270° | +270° | +0.125 | [0800] | 0 | | +360° | | [0800] | −90° | |
| −360° | +360° | +0.00 | [0000] | 0 | | +360° | | [0000] | 0° | |

768kHz SAMPLING (MARGIN OF 16kHz BANDWIDTH)

4    212    556    768kHz

384kHz SAMPLING
384kB, 45.8% COS²-ROF (LOSS OF 0.02dB AT 96kHz POINT)

104    280    384kHz kHz SAMPLING
384kB, 99.9% COS²-ROF 104    280    384kHz

384kHz SAMPLING 104    280   384    768kHz

[COMPARISON OF ROM CAPACITY] FOR PHAD WITH 12-BIT ACCURACY

|  | ROM CONTAINING ALL FILTER COEFFICIENTS | ROM IN THE EMBODIMENT |
|---|---|---|
| $C_1$ | 4096 WORDS | 76 WORDS |
| $C_2$ | 4096 WORDS | 34 WORDS |
| $C_3$ | 4096 WORDS | 34 WORDS |
| AREA DECISION | 0 WORD | 128 WORDS |
| TOTAL | 12288 WORDS | 272 WORDS |

FIG. 25
RELATED ART

| | | | | | |
|---|---|---|---|---|---|
| -.00010681152 | 81FFF9 | -.00007629395 | 81FFFB | 31 | +180° |
| -.00019836426 | 81FFF3 | -.00013732910 | 81FFF7 | 30 | |
| -.00030517578 | 81FFEC | -.00021362305 | 81FFF2 | 29 | |
| -.00041198730 | 81FFE5 | -.00028991699 | 81FFED | 28 | |
| -.00048828125 | 81FFE0 | -.00035095215 | 81FFE9 | 27 | |
| -.00054931641 | 81FFDC | -.00038146973 | 81FFE7 | 26 | |
| -.00057983398 | 81FFDA | -.00041198730 | 81FFE5 | 25 | |
| -.00059509277 | 81FFD9 | -.00042724609 | 81FFE4 | 24 | |
| -.00057983398 | 81FFDA | -.00041198730 | 81FFE5 | 23 | |
| -.00053405762 | 81FFDD | -.00038146973 | 81FFE7 | 22 | |
| -.00047302246 | 81FFE1 | -.00033569336 | 81FFEA | 21 | |
| -.00038146973 | 81FFE7 | -.00027465820 | 81FFEE | 20 | |
| -.00027465820 | 81FFEE | -.00019836426 | 81FFF3 | 19 | |
| -.00018310547 | 81FFF4 | -.00012207031 | 81FFF8 | 18 | |
| -.00009155273 | 81FFFA | -.00006103516 | 81FFFC | 17 | |
| 0.00000000000 | 000000 | 0.00000000000 | 000000 | 16 | 0° |
| 0.00006103516 | 000004 | 0.00004577637 | 000003 | 15 | |
| 0.00010681152 | 000007 | 0.00007629395 | 000005 | 14 | |
| 0.00012207031 | 000008 | 0.00009155273 | 000006 | 13 | |
| 0.00010681152 | 000007 | 0.00007629395 | 000005 | 12 | |
| 0.00006103516 | 000004 | 0.00004577637 | 000003 | 11 | |
| 0.00000000000 | 000000 | 0.00000000000 | 000000 | 10 | |
| -.00007629395 | 81FFFB | -.00006103516 | 81FFFC | 9 | |
| -.00016784668 | 81FFF5 | -.00012207031 | 81FFF8 | 8 | |
| -.00024414063 | 81FFF0 | -.00016784668 | 81FFF5 | 7 | |
| -.00032043457 | 81FFEB | -.00022888184 | 81FFF1 | 6 | |
| -.00035095215 | 81FFE9 | -.00024414063 | 81FFF0 | 5 | |
| -.00036621094 | 81FFE8 | -.00025939941 | 81FFEF | 4 | |
| -.00033569336 | 81FFEA | -.00024414063 | 81FFF0 | 3 | |
| -.00027465820 | 81FFEE | -.00019836426 | 81FFF3 | 2 | |
| -.00015258789 | 81FFF6 | -.00010681152 | 81FFF9 | 1 | |
| 0.00000000000 | 00000 | 0.00000000000 | 00000 | 0 | -180° |

TIMING PHASE CONTROL APPARATUS AND TIMING PHASE CONTROL METHOD

BACKGROUND OF THE INVENTION

(1) Field of the Invention

The present invention relates to a timing phase control apparatus and a timing phase control method which are particularly suitable for use in a modem used for very high speed data transmission employing a metallic line.

(2) Description of the Related Art

In general, a modem (modulator/demodulator) is used to transmit data over a phone line, a leased line, an in-plant metallic line, and so forth. In recent years, a more inexpensive higher-speed modem has been required in the modem market. In order to meet the market requirements, digital signal processing of a DSP (Digital Signal Processor) is used to reduce hardware as much as possible, resulting in commercial availability of a more inexpensive higher-speed modem.

FIG. 22 is a block diagram showing one illustrative system for data communication through the modem. In a data communication system 100 shown in FIG. 22, a host processor 101 is connected to a metallic line 105 through a modem (modulator/demodulator) 102 serving as a master (ST2, ST1), and a terminal 104 is connected to the metallic line 105 through a modem 103 serving as a slave (RT).

Here, the metallic line 105 is a line including metal wire such as copper wire, and data can be transmitted over the metallic line 105 at very high speed of, for example, about 1.5 Mbps. The metallic line 105 can be connected to the host processor 101 and the terminal 104 for use in processing of a massive amounts of data such as image information, and transmission and reception of the data.

Further, the modems 102, 103 chiefly include an MPU (Microprocessor Unit), an A/D converter, a D/A converter, a low-pass filter, and the DSP. Receive data is processed through, for example, gray/natural transformation, summation, signal point generation, roll off filter processing, and modulation processing, and is thereafter converted through digital-to-analog conversion to be transmitted to the metallic line 105. On the other hand, a received modulated analog signal is converted into a digital signal, and is thereafter processed through signal processing such as demodulation, decimation processing, timing phase control, and decision, resulting in reproduction of the data. Moreover, the reproduced data is output to the host processor 101 or the terminal 104.

Meanwhile, the modem 102 on the side of the host processor 101 includes one part (ST2) operated by an internally generating clock, and another part (ST1) operated depending upon a clock signal from the host processor 101. The modem 103 serving as the slave (RT) on the side of the terminal 104 is operated by a clock signal generated depending upon a clock component in a signal from the modem 102.

Here, the timing phase control is made to the receive data by the slave modem 103 appropriately using a timing PLL (Phase Locked Loop) in a DSP 103b. However, in the master modem 102, the timing phase control is made through filter processing by a timing phase control filter.

That is, as shown in FIG. 23, the master modem 102 includes a timing extracting portion 102A to extract a timing phase of a receive signal, a phase deciding portion (TIMJ) 102B to decide the timing phase extracted in the timing extracting portion 102A, and a timing phase control filter (TMA) 102C to make a timing phase control depending upon the result of decision in the phase deciding portion 102B.

For example, the phase deciding portion 102B decides in which of 32 areas obtained by equally dividing a range of −180° to +180° the timing phase extracted in the timing extracting portion 102A is.

Further, the timing phase control filter 102C includes, for example, a transversal filter 102a for a 29-stage tap operation as shown in FIG. 24.

Here, in the transversal filter 102a shown in FIG. 24, reference numerals 102a-1 to 102a-29 respectively designate delay portions ($X_1$ to $X_{29}$) to delay receive signals (DEM1R-4R and DEM1I-4I) by a quarter tap.

Further, reference numerals 102b-1 to 102b-29 respectively indicate multipliers to multiply receive taps delayed in the delay portions 102a-1 to 102a-29 by tap coefficients $C_1$ to $C_{29}$, and 102c is a total sum calculating portion to calculate and output the total sum of signals obtained by the tap operation in the multipliers 102b-1 to 102b-29.

Moreover, reference numeral 102d denotes a rounding portion to round an operation result from the total sum calculating portion 102c, and output the result as a timing phase control result.

Meanwhile, the transversal filter 102a is provided with a coefficient information memory 102e containing data of the respective tap coefficients $C_1$ to $C_{29}$ with phase decision information as address information. Thus, the coefficient information memory 102e can output a corresponding tap coefficient to the transversal filter 102a depending upon a phase decision result (TIMJL of, for example, 5 bits) from the phase deciding portion 102B.

Moreover, FIG. 25 is a diagram showing a part of the coefficient information memory 102e. In FIG. 25, a range of 360° is divided into 32 areas (at 11.25 degree intervals), thereby showing the tap coefficients $C_1$ set for each of phase information in the 32 areas. Consequently, the actual coefficient information memory 102e contains information about the tap coefficients $C_2$ to $C_{29}$ as well as the information about the tap coefficients $C_1$ as shown in FIG. 25.

That is, depending upon the phase decision result (for example, 5-bit data) from the phase deciding portion 102B, the timing phase control filter 102C can derive from the coefficient information memory 102e all the tap coefficients $C_1$ to $C_{29}$ to be multiplied by the receive taps in the multipliers 102b-1 to 102b-29.

In the modem 102 shown in FIG. 22, the timing phase control is made by the digital signal processing of the DSP, thereby providing a more inexpensive higher-speed modem in recent years. In order to realize significant cost reduction, it is necessary to reduce the number of mounted DSPs.

However, in the modem 102 as shown in FIG. 22, values of the tap coefficients of the timing phase control filter 102C are previously held in the table 102e as table data.

As the modem has a higher transmission speed, an error of the timing phase must be made smaller. It is thereby necessary to improve an accuracy of the tap coefficient of the timing phase control filter. This case produces an increase in amount of table data serving as tap coefficient data to be contained in the table 102e, resulting in a problem in that the number of DSPs is increased.

For example, when the timing phase control filter 102C includes the 29-stage transversal filter 102a as described above, the table 102e must contain all the tap coefficients according to 32 types of decision results. For the tap coefficient $C_1$ used for the tap operation in the multiplier 102b-1, it is required to store values as shown in FIG. 25 according to the phase decision result.

SUMMARY OF THE INVENTION

In view of the foregoing problems, it is an object of the present invention to provide a timing phase control apparatus and a timing phase control method in which an accuracy of a tap coefficient can be improved while reducing an amount of information about the tap coefficient, which should be stored.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 7 and 8 are diagrams explaining the operations of the essential parts of the timing phase control apparatus according to the embodiment;

FIGS. 11 to 17 are diagrams respectively showing approximate expression coefficient tables according to the embodiment;

FIGS. 19, and 20(a) to 20(d) are diagrams explaining the operations of the timing phase control apparatus according to the embodiment;

FIG. 25 is a diagram showing filter coefficient information stored in the master modem in the data communication system shown in FIG. 22.

DESCRIPTION OF THE PREFERRED EMBODIMENTS (a) Description of Aspect of the Invention A description will now be given of an aspect of the present invention referring to the accompanying drawings.

Figure 1:
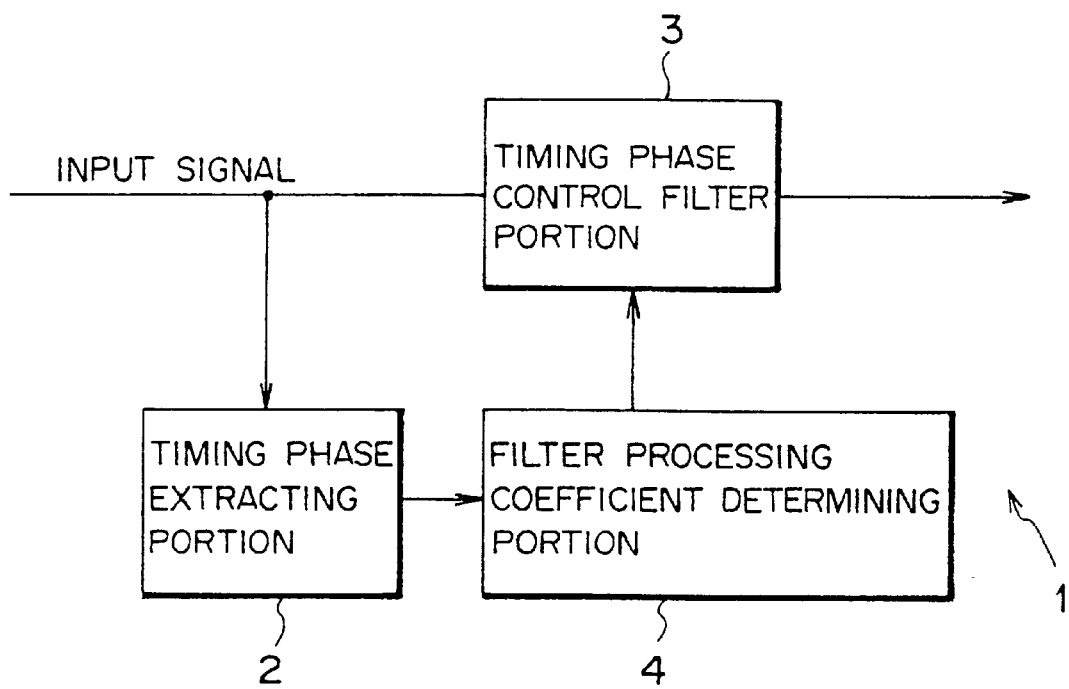
FIG. 1 is a block diagram showing an aspect of the present invention.

FIG. 1 is a block diagram showing the aspect of the present invention. In FIG. 1, reference numeral 1 designates a timing phase control apparatus. The timing phase control apparatus 1 includes a timing phase extracting portion 2, a timing phase control filter portion 3, and a filter processing coefficient determining portion 4.

Here, the timing phase extracting portion 2 extracts timing phase information from an input signal, and the timing phase control filter portion 3 makes a timing phase control to the input signal depending upon the timing phase information from the timing phase extracting portion 2 through filter processing using a coefficient operation having a preset impulse response characteristic.

Further, the filter processing coefficient determining portion 4 determines the coefficients used for the filter processing in the timing phase control filter portion 3 depending upon the timing phase information and information about a linear approximate expression of the impulse response characteristic.

Further, the filter processing coefficient determining portion 4 may include a phase information area deciding portion to decide an area of the timing phase information input from the timing phase extracting portion 2, a coefficient information extracting portion to extract information about a coefficient of the linear approximate expression depending upon a phase decision result from the phase information area deciding portion, and a filter processing coefficient calculating portion to calculate the coefficient used for the filter processing by using a linear approximate expression coefficient extracted in the coefficient information extracting portion, and the timing phase information.

In this case, for each of a plurality of areas corresponding to the phase decision results in the phase information area deciding portion, there may be provided a coefficient storage table in which the coefficient of the linear approximate expression obtained by linear approximation of the impulse response characteristic is stored as table data. Further, the coefficient information extracting portion may extract the coefficient of the linear approximate expression by referring to the coefficient storage table depending upon the phase decision result from the phase information area deciding portion.

Additionally, there may be provided an area decision table in which area decision information corresponding to the timing phase information is stored, and the phase information area deciding portion may decide the area of the timing phase information by referring to the area decision table depending upon the timing phase information from the timing phase extracting portion 2.

Further, there may be provided a coefficient operation start position determining portion to determine an operation start position of the coefficient operation in the filter processing depending upon the timing phase information. In this case, the coefficient operation start position determining portion may determine the operation start position depending upon high-order bits in the timing phase information, and the filter processing coefficient determining portion 4 may determine the coefficient used for the filter processing by using low-order bits in the timing phase information.

Alternatively, the impulse response characteristic may have a characteristic of a cosine-squared filter in the timing phase control filter portion 3, or the timing phase control filter portion 3 may include a transversal filter.

In addition, the timing phase control apparatus of the present invention is characterized by including the timing phase extracting portion to extract the timing phase information from the input signal, the timing phase control filter portion to make the timing phase control to the input signal through the filter processing using the coefficient operation having the preset impulse response characteristic depending upon the timing phase information from the timing phase extracting portion, the filter processing coefficient determining portion to determine the coefficient used for the filter processing in the timing phase control filter portion depending upon the low-order bits in the timing phase information and the information about the linear approximate expression of the impulse response characteristic, and the coefficient operation start position determining portion to determine the operation start position of the coefficient operation in the filter processing depending upon the high-order bits in the timing phase information.

Further, a timing phase control method of the present invention is characterized by including the steps of extracting the timing phase information from the input signal, calculating the operation coefficient used for the timing phase control depending upon the extracted timing phase information and the approximate expression preset corresponding to the timing phase information, and performing the coefficient operation by using the calculated operation coefficient, thereby performing the filter processing for the timing phase control of the input signal.

Therefore, according to the present invention, the timing phase extracting portion extracts the timing phase information from decimation output serving as the input signal, and the filter processing coefficient determining portion determines the coefficient used for the filter processing in the timing phase control filter portion depending upon the timing phase information and the information about the approximate expression of the impulse response characteristic. Thereby, the timing phase control filter portion can perform the filter processing through the operation using the coefficient determined as described above. Thus, it is possible to eliminate the need for storage of all the filter coefficients, and it is sufficient to simply store a small amount of information required to calculate the filter coefficient through the linear approximate expression. There is one advantage in that an available capacity for a ROM (Read Only Memory) forming the table can considerably be reduced, and another advantage in that an accuracy of a tap coefficient can be enhanced while limiting an amount of information about the tap coefficient, which should be stored.

(b) Description of One Embodiment of the Invention

A description will now be given of an embodiment of the present invention referring to the accompanying drawings.

Figure 2:
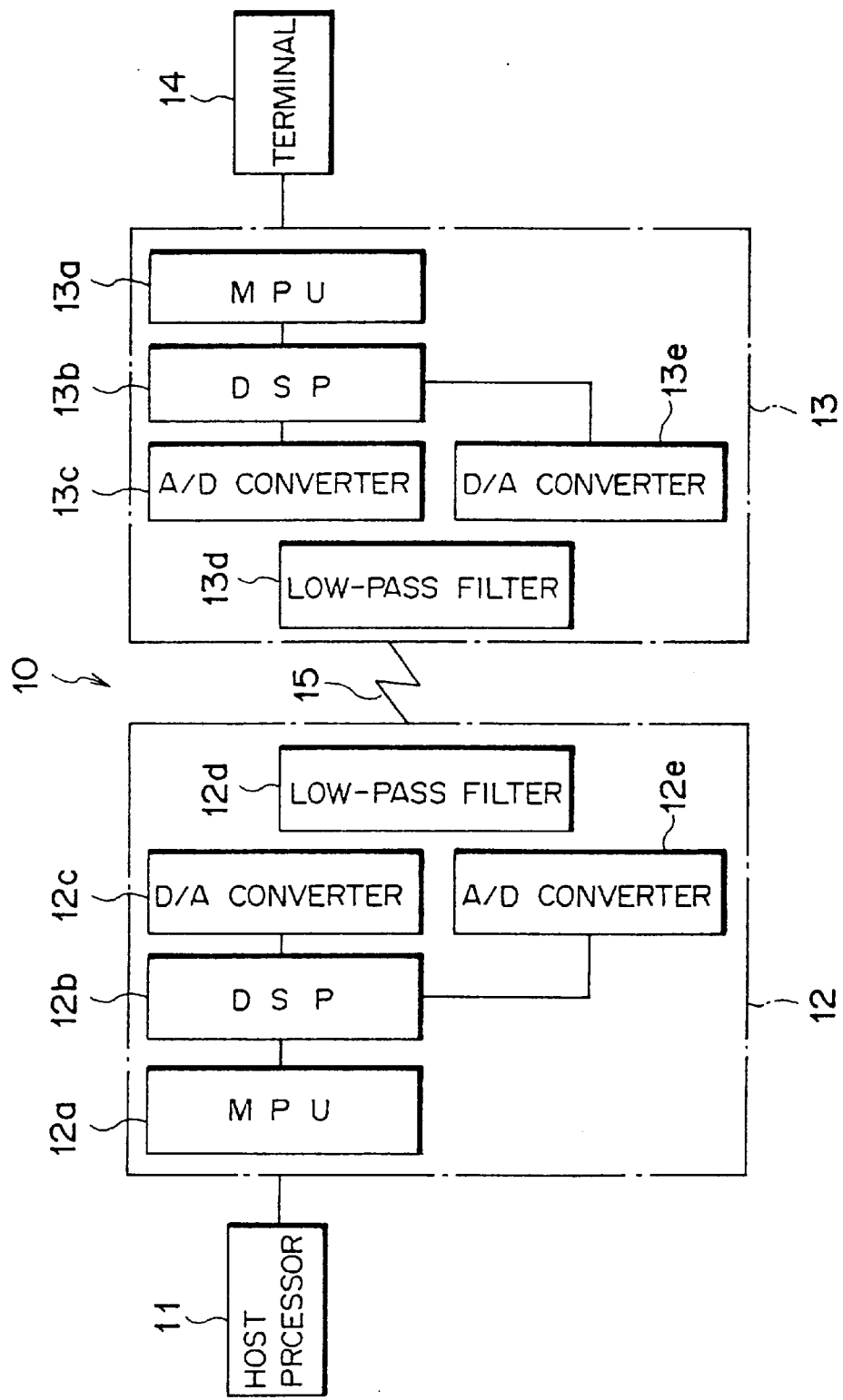
FIG. 2 is a block diagram showing a data communication system applied to one embodiment of the present invention.
Figure 3:
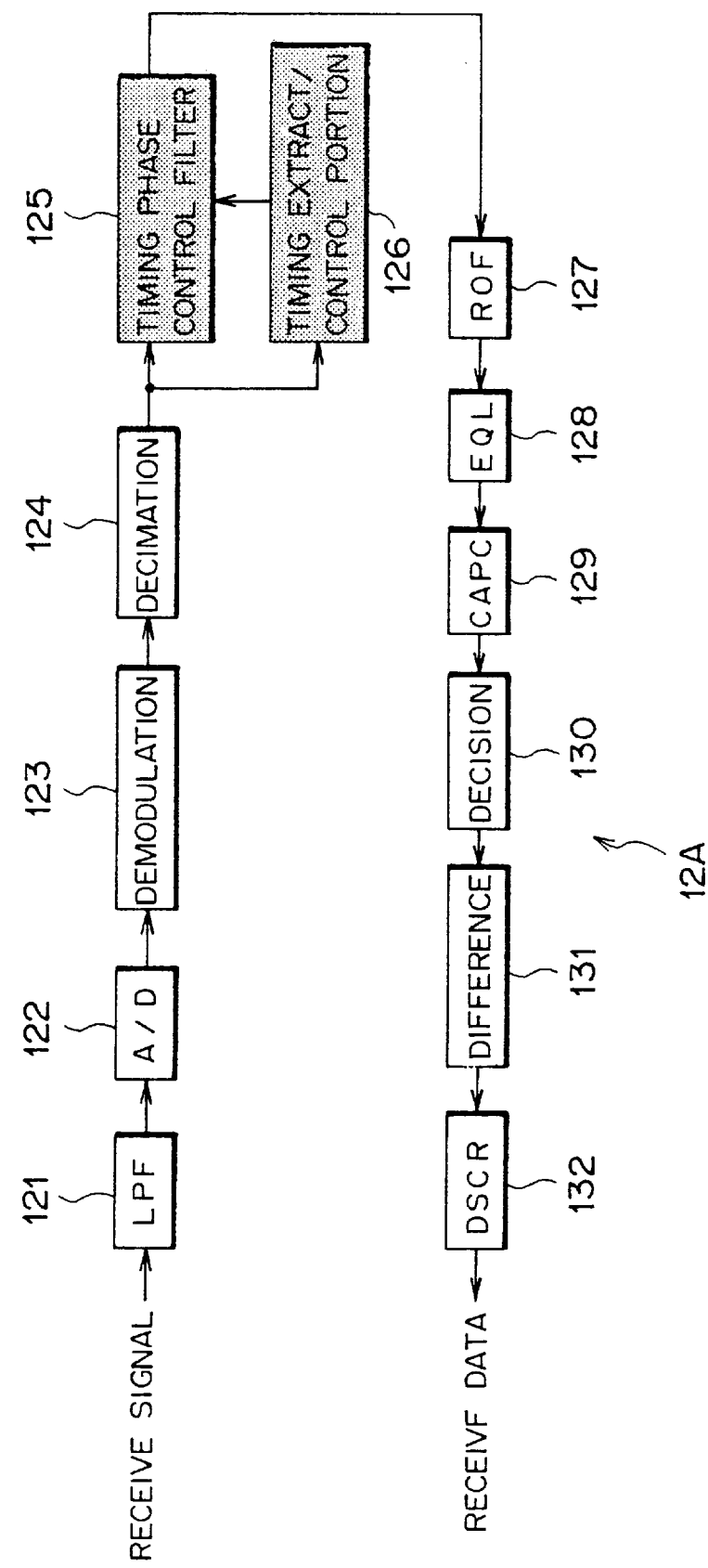
FIG. 3 is a block diagram showing a receive portion in a modem to which a timing phase control apparatus according to the embodiment of the present invention is applied.

FIG. 3 is a block diagram showing a receive portion in a modem to which a timing phase control apparatus according to one embodiment of the present invention is applied. It is possible to carry out data communication as shown in FIG. 2 by using a modem 12 whose receive portion 12A is shown in FIG. 3.

That is, in a data communication system 10 shown in FIG. 2, a host processor 11 is connected to a metallic line 15 through the modem (modulator/demodulator) 12 serving as a master (ST2, ST1), and a terminal 14 is connected to the metallic line 15 through a modem 13 serving as a slave (RT).

Here, the modem 12 performs interface processing (such as modulation/demodulation) of a transmit signal and a receive signal between the host processor 11 and the metallic line 15. The modem 13 performs interface processing (such as modulation/demodulation) of a transmit signal and a receive signal between the terminal 14 and the metallic line 15.

Moreover, the modem 12 on the side of the host processor 11 includes one part (ST2) operated by an internally generating clock, and another part (ST1) operated depending upon a clock signal from the host processor 11. The modem 13 serving as the slave (RT) on the side of the terminal 14 is operated by a clock signal generated depending upon a clock component in a signal from the modem 12.

Here, the metallic line 15 is a line including metal wire such as copper wire, and data can be transmitted over the metallic line 15 at very high speed of, for example, about 1.5 Mbps. The metallic line 15 can be connected to the host processor 11 and the terminal 14 for use in processing of a massive amounts of data such as image information, and transmission and reception of the data.

Meanwhile, in view of hardware, the modems 12 includes an MPU (Microprocessor Unit) 12a, a DSP (Digital Signal Processor) 12b, a D/A converter 12c, a low-pass filter 12d, and an A/D converter 12e. Similarly, the modem 13 includes an MPU 13a, a DSP 13b, an A/D converter 13c, a low-pass filter 13d, and a D/A converter 13e.

Here, in the modems 12 and 13, the MPUs 12a, 13a and the DSPs 12b, 13b perform various types of signal processing such as modulation, and demodulation of the transmit signal and the receive signal exchanged between the host processor 11 and the terminal 14.

Further, the D/A converter 12c converts the transmit data (digital signal) to be transmitted to the terminal from the host processor 11 into an analog signal. The A/D converter 12e converts the receive signal (analog signal) received from the modem 13 through the metallic line 15 into a digital signal.

Similarly, the A/D converter 13c converts data (analog signal) transmitted to the terminal 14 from the host processor 11 into a digital signal. The D/A converter 13e converts data (digital signal) to be transmitted from the modem 13 through the metallic line into an analog signal.

Further, the low-pass filter 13d removes a noise component (high-frequency component) in a signal input through the metallic line 15 from the host processor 11, and the low-pass filter 12d removes a noise component (high-frequency component) in a signal input through the metallic line 15 from the terminal 14.

Meanwhile, the modem 12 includes a transmit portion (not shown) to, for example, modulate a transmit signal from the host processor 11, and transmit the result to the terminal 14 through the metallic line 15, and the receive portion 12A (see FIG. 3) to, for example, demodulate a receive signal received from the terminal 14 through the metallic line 15, and output the result to the host processor 11 as shown in FIG. 3.

Further, the modem 13 includes a transmit portion to, for example, modulate a transmit signal from the terminal 14, and transmit the result to the host processor 11 through the metallic line 15, and a receive portion to, for example, demodulate a receive signal received from the host processor 11 through the metallic line 15, and output the result to the terminal 14. Moreover, the transmit portion and the receive portion of the modem 13 are not illustrated.

Meanwhile, as specifically shown in FIG. 3, the receive portion of the modem 12 includes a low-pass filter (LPF) 121, an A/D converting portion 122, a demodulating portion 123, a decimation processing portion 124, a timing phase control filter 125, a timing extract/control portion 126, a roll off filter (ROF) 127, an equalizing portion (EQL) 128, a carrier phase correcting portion 129, a decision portion 130, a difference calculating portion 131, and a descrambler (DSCR) 132.

Moreover, the low-pass filter (LPF) 121 includes the low-pass filter 12d shown in FIG. 2, and the A/D converting portion 122 includes the A/D converter 12e shown in FIG. 2.

Further, the demodulating portion 123, the decimation processing portion 124, the timing phase control filter 125, the timing extract/control portion 126, the roll off filter 127, the equalizing portion 128, and the carrier phase correcting portion 129 respectively include the DSP 12b as shown in FIG. 2 to perform various types of signal processing at a signal receive time. Besides, the decision portion 130, the difference calculating portion 131, and the descrambler 132 can respectively include the MPU 12a as shown in FIG. 2.

Here, the timing phase control filter 125 performs digital filter processing for a timing phase control with respect to receive data from the decimation processing portion 124.

Moreover, as will be described infra, the coefficient used for the filter processing in the timing phase control filter 125 can be calculated according to an approximate expression of a preset impulse response characteristic depending upon timing phase information extracted in the timing extract/control portion 126. That is, the timing phase control filter 125 and the timing extract/control portion 126 form the timing phase control apparatus.

Figure 4:
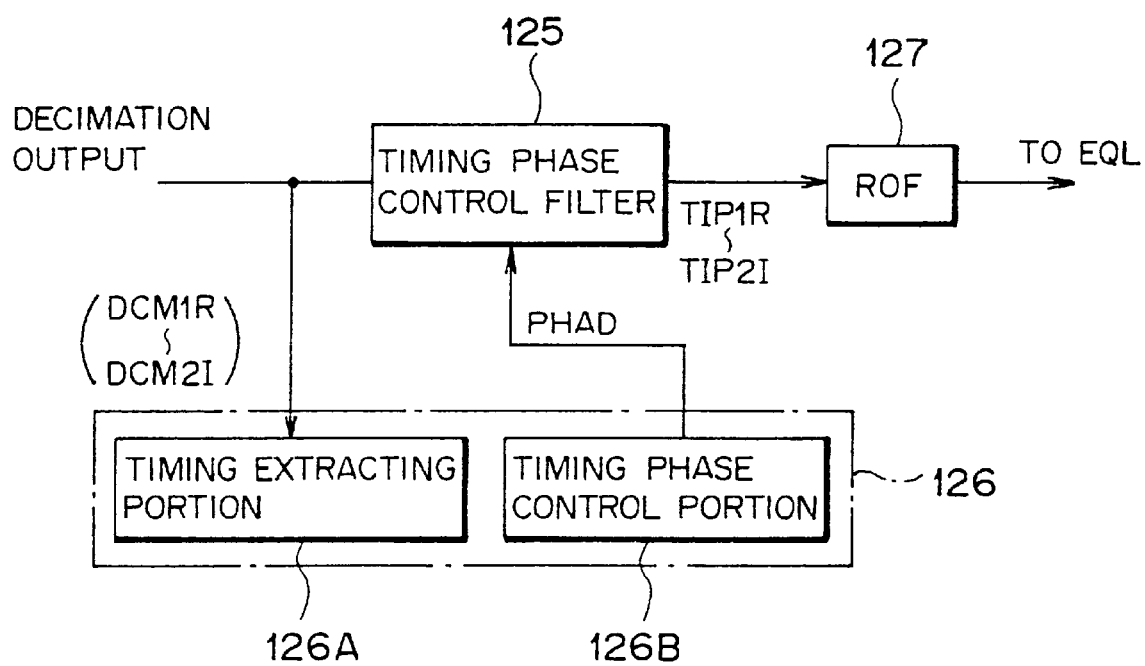
FIG. 4 is a block diagram showing the timing phase control apparatus according to the embodiment.

Meanwhile, the timing extract/control portion 126 extracts timing information of the receive data from the decimation processing portion 124, and calculates the filter coefficient used for the filter processing in the timing phase control filter 125. As shown in FIG. 4, the timing extract/control portion 126 includes a timing extracting portion 126A and a timing phase control portion 126B.

Figures 5, 5A:
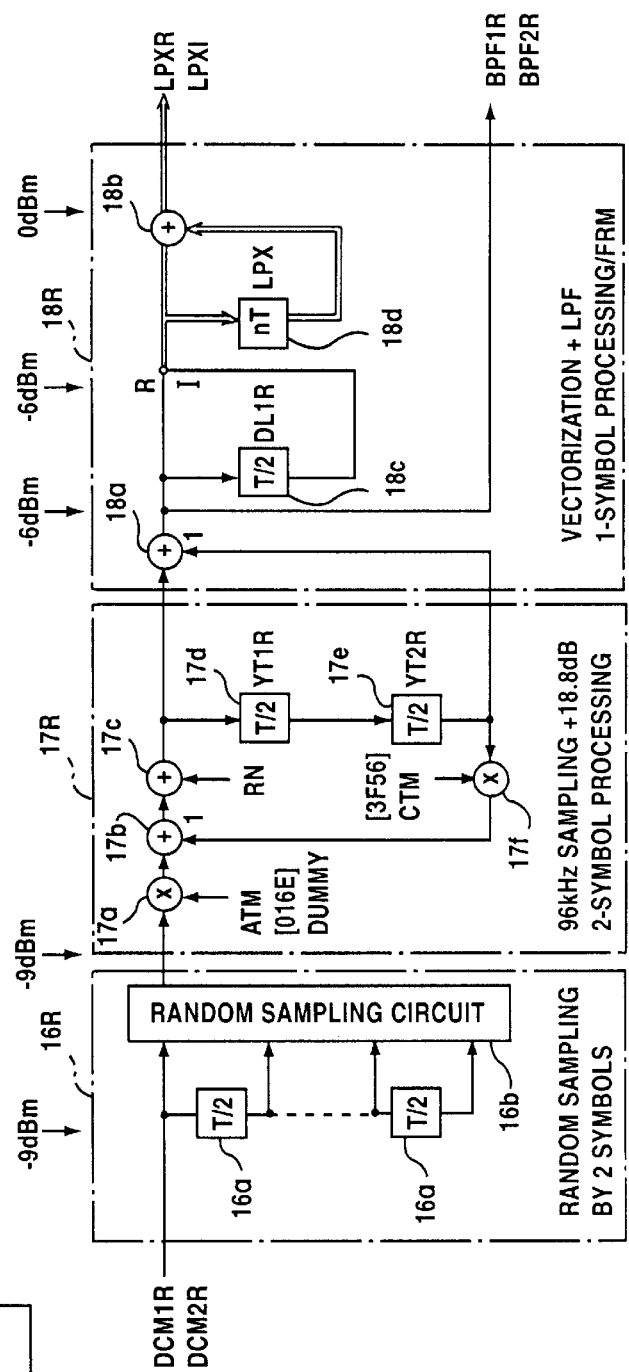
FIGS. 5 and 6 are diagrams showing essential parts of the timing phase control apparatus according to the embodiment.
Figure 5B:
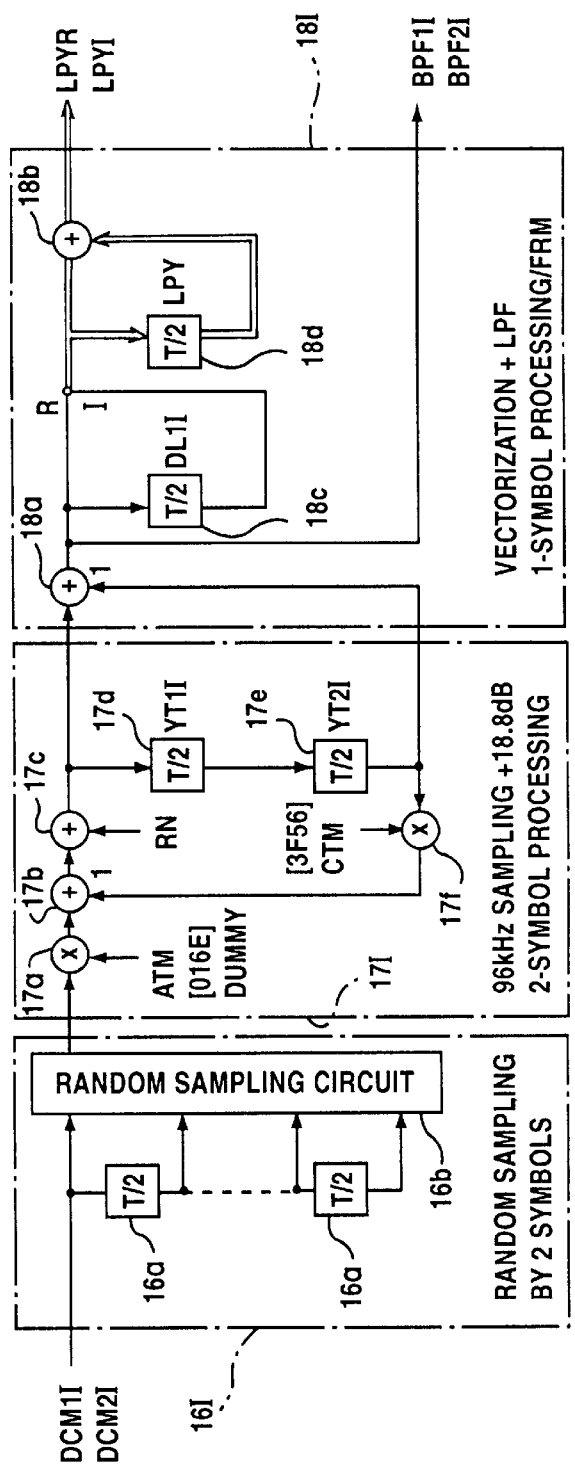
Figure 5C:
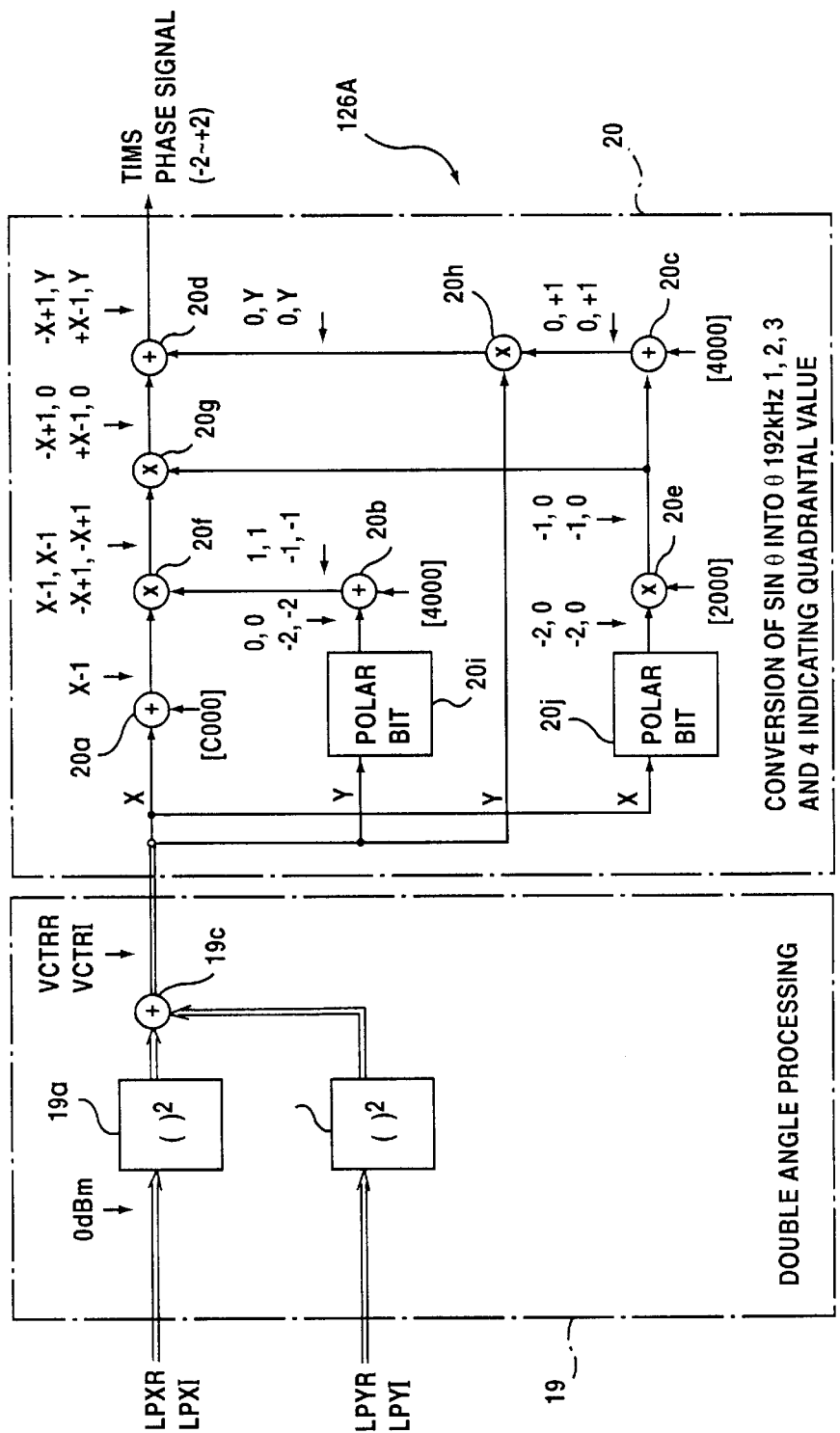

Further, the timing extracting portion 126A extracts the timing phase information from the 2-symbol receive data serving as an input signal. As specifically shown in FIG. 5, the timing extracting portion 126A includes random sampling portions 16R, 16I, 96 kHz sampling portions 17R, 17I, vectorization/low-pass filter portions 18R, 18I, a double angle processing portion 19, and a $\sin\theta/\theta$ converting portion 20.

Here, the random sampling portions 16R, 16I respectively sample at random 2-symbol real part data (DCM1R, DCM2R), and 2-symbol imaginary part data (DCM1I, DCM2I) of the receive data from the decimation processing portion 124. The random sampling portions 16R, 16I include taps 16a connected to form a plurality of stages, and a random sampling circuit 16b. Here, the taps 16a are connected to form the stages having the number which is required for the random sampling circuit 16b to take as inputs signals having the number corresponding to the number of sample points for one cycle of FRM (the intermediate taps being not shown).

Further, with respect to data from the random sampling portions 16R, 16I, the 96 kHz sampling portions 17R, 17I respectively sample a signal component of 96 kHz band serving as ½ Nyquist frequency. The 96 kHz sampling portions 17R, 17I are provided with multipliers 17a, 17f, adders 17b, rounding portions 17c, and taps 17d, 17e.

In addition, the vectorization/low-pass filter portion 18R vectorizes the signal component (scalar information) of 96 kHz band sampled in the 96 kHz sampling portion 17R to output the result as signal components (LPXR, LPXI). On the other hand, with respect to data obtained by the random sampling in the random sampling portion 16R, the vectorization/low-pass filter portion 18R can output signal components (BPF1R, BPR2R) of 96 kHz band, from which unnecessary high-frequency components are removed.

Similarly, the vectorization/low-pass filter portion 18I vectorizes the signal component of 96 kHz band dsampled in the 96 kHz sampling portion 17I to output the result as signal components (LPYR, LPYI). On the other hand, with respect to data obtained by the random sampling in the random sampling portion 16I, the vectorization/low-pass filter portion 18I can output signal components (BPF1I, BPR2I) of 96 kHz band, from which unnecessary high-frequency components are removed. Further, the vectorization/low-pass filter portions 18R, 18I respectively include adders 18a, 18b, and taps 18c, 18d.

Further, the double angle processing portion 19 takes as inputs the vectorized signals (LPXR, LPXI), (LPYR, LPYI) of 96 kHz band from the vectorization/low-pass filter portions 18R, 18I, and calculates the sum of squares of the respective vector signals, thereby generating double angle components of the vector signals from the vectorization/low-pass filter portions 18R, 18I. The double angle processing portion 19 includes square calculating portions 19a, 19b, and an adder 19c.

In addition, with respect to vector information having the double angle components from the double angle processing portion 19, the $\sin\theta/\theta$ converting portion 20 converts the angle component ($\sin\theta$) into scalar information ($\theta$) ranging from −2.0 to +2.0, and outputs a conversion result as a phase signal (TIMS: extracted timing signal). The double angle processing portion 19 includes adders 20a to 20d, multipliers 20e to 20h, and polar bit feeding portions 20i, 20j.

Further, the timing phase control portion 126B shown in FIG. 4 performs desired calculation on timing phase components extracted in the timing extracting portion 126A to output the result as timing phase information (PHAD). As specifically shown in FIG. 6, the timing phase control portion 126B includes a least significant bit output portion 21, a first integrating circuit 22, a second integrating circuit 23, and a mode switching circuit 24.

Moreover, in the following discussion, for purpose of explanation, 16-bit binary data are represented in the hexadecimal system ([0000] to [FFFF]). That is, among the timing phase information (TIMS) from the timing extracting portion 126A, binary numbers "+0.0" to "+2.0" correspond to hexadecimal numbers [0000] to [7FFF], and binary numbers "−0.0" to "−2.0" correspond to hexadecimal numbers [FFFF] to [8000].

The least significant bit (LSB) extracting portion 21 outputs ±LSB according to polarity of the input timing phase information (the 16-bit binary data). The least significant bit output portion 21 includes a polar bit extracting portion 21a to extract a polar bit, an adder 21b to add a value [4000] to the polar bit, and a multiplier 21c to multiply an addition result from the adder 21b by a value [0001].

Specifically, the least significant bit output portion 21 outputs +LSB in case of the input timing phase information ranging from "+0.0" to "+2.0", while the least significant bit output portion 21 outputs −LSB in case of the timing phase information ranging from "−0.0" to "−2.0".

Further, the first integrating circuit 22 performs an integral operation of the ±LSB input from the least significant bit output portion 21 by using a time constant different from that of the second integrating circuit 23. The first integrating circuit 22 includes an adder 22a, a 9 low order bits extracting portion 22b, a 7 high order bits extracting portion 22c, a multiplier 22d, an adder 22e, and a tap (TMCA counter) 22f.

Similarly, a multiplier 23g performs an operation of an integral operation result from the first integrating circuit 22 to provide the ±LSB, and the second integrating circuit 23 performs integral operation of a value of the ±LSB. The second integrating circuit 23 includes an adder 23a, a 14 low order bits extracting portion 23b, a 2 high order bits extracting portion 23c, a multiplier 23d, an adder 23e, a tap (TMCC counter) 23f, and the multiplier 23g.

A specific description will now be given of the first integrating circuit 22 since the first integrating circuit 22 and the second integrating circuit 23 perform fundamentally the same integral operation.

The adder 22a adds the ±LSB output from the multiplier 21c to a value stored in the tap 22f. Further, the 9 low order bits extracting portion 22b executes AND operation between an addition result (16 bits) from the adder 22a and a value [01FF], thereby extracting 9 low order bits of the addition result.

Similarly, the 7 high order bits extracting portion 22c executes AND operation between an output signal from the adder 22a and a hexadecimal number [FE00], thereby extracting 7 high order bits of an addition result. The extracted data is output to the second integrating circuit 23 as output from the first integrating circuit 22, and is also output to the multiplier 22d.

Additionally, the multiplier 22d multiplies output (the 7 high order bits of the output from the adder 22a) from the 7 high order bits extracting portion 22c by ½, and outputs a multiplication result to the adder 22e.

Besides, the adder 22e adds the multiplication result from the multiplier 22d to output from the 9 low order bits extracting portion 22b, thereafter storing a result in the tap 22f. As shown in FIG. 7, if the addition result from the adder 22a is in the range of "+0.00" to "+0.03124", the value is directly output to the tap 22f as the addition result.

Alternatively, the adder 22e outputs "0.015625" if the addition result from the adder 22a is equal to "+0.03125", or outputs "−0.015625" in case of the addition result of "−0.0", thereby causing an automatic jump to return the addition result of the adder 22a to an intermediate position in the range of "0.00" to "+0.03124". It is thereby possible to restart the addition from the intermediate position in the adder 22a.

In other words, when the addition result of the adder 22a is equal to "±0.03125" (represented as [0200] in the hexadecimal system), the adder 22e returns a tap stored in the tap 22f to an intermediate position value of "0.015625" in the range from "+0.0" to "+0.03124". Moreover, in FIG. 7, the timing phase information is represented in the hexadecimal system except only the second high order digit represented in the binary system.

Similarly, in the second integrating circuit 23, the multiplier 23g performs an operation of the output signal from the first integrating circuit 22 to provide the ±LSB, and an integral operation is performed substantially as in the first integrating circuit 22.

For example, as shown in FIG. 8, if the addition result from the adder 22a is in the range of "+0.00" to "+0.99", the value is directly output to the tap 23f as the addition result, and is also output as output of the second integrating circuit 23.

Alternatively, the adder 23e adds "+0.50" to a value of 14 low order bits if the addition result from the adder 23a is equal to "+1.00", while the adder 23e adds "−0.50" to the value of 14 low order bits if the addition result is "−00", thereby causing an automatic jump to return the addition result of the adder 23a to an intermediate position in the range of "0.00" to "+0.99". It is thereby possible to restart the addition from the intermediate position in the adder 23a. Moreover, in FIG. 8, the timing phase information is represented in the hexadecimal system except only the most significant digit represented in the binary system.

Meanwhile, the range in which the low order bits of the output signal from the adder 22a or 23a can directly be output as the output signal can appropriately be set depending upon a ratio of the extracted high order bits to the extracted low order bits. For example, the range can be made wider by decreasing the number of high order bits, or the range can be made narrower by increasing the number of high order bits.

In addition, the first integrating circuit 22 and the second integrating circuit 23 have different ratios of the extracted high order bits to the extracted low order bits so that both of them have different time constants for the integral operation.

Figure 6:
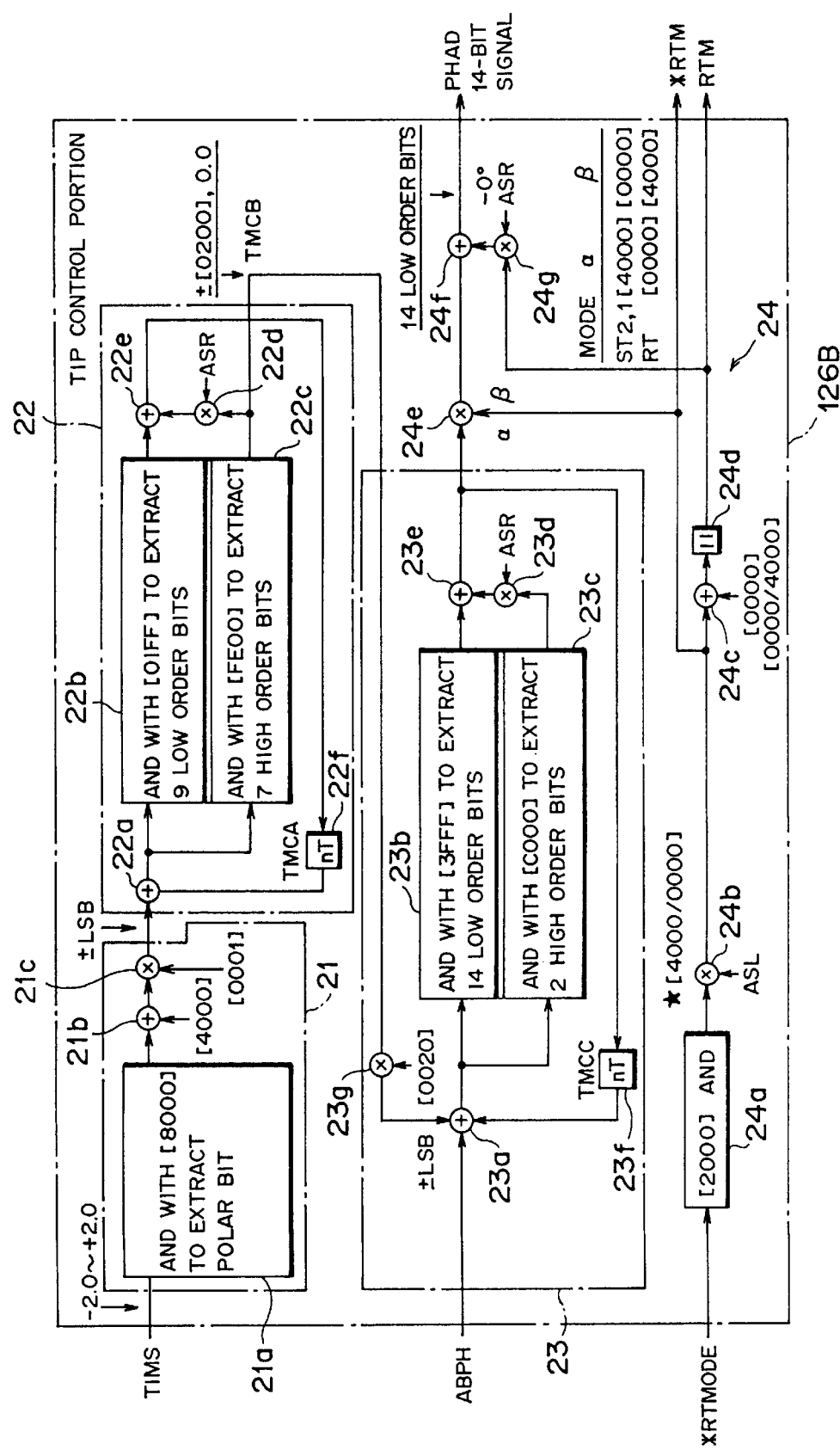

Further, the mode switching circuit 24 shown in FIG. 6 is used for switching of operating states of the timing phase control filter 125 and the timing extract/control portion 126 depending upon a mode switching signal *RTMODE for switching of the modem to any one of master mode (ST2, ST1) and slave mode (RT). The mode switching circuit 24 includes an AND circuit 24a, multipliers 24b, 24e, and 24g, adders 24c, 24f, and an absolute value calculating portion 24d.

Moreover, the multiplier 24e and the adder 24f of the mode switching circuit 24 perform a desired calculation for mode switching on an integration result (16 bits) from the second integrating circuit 23. Thereafter, a 14-low-order-bit signal is output as a signal PHAD for control of the timing phase control filter 125.

Thus, the timing extract/control portion 126 can extract the timing phase component from the 2-symbol receive data serving as the input signal, and can output a result as the timing phase information (PHAD), resulting in functioning as the timing phase extracting portion.

As set forth above, the timing phase control filter 125 makes the timing phase control to an input signal through the filter processing using the coefficient operation having the preset impulse response characteristic depending upon the timing phase information. As specifically shown in FIG. 9, the timing phase control filter 125 includes a timing phase control filter portion 125A, a filter processing coefficient determining portion 125B, and a coefficient operation start position determining portion 125C.

Here, depending upon the timing phase information from the timing extract/control portion 126, the timing phase control filter portion 125A makes the timing phase control to input signals, i.e., output (DCM1R, DCM1I, DCM2R, and DCM2I) of the decimation processing portion 124 through the filter processing using the coefficient operation having the preset impulse response characteristic.

Figure 10:
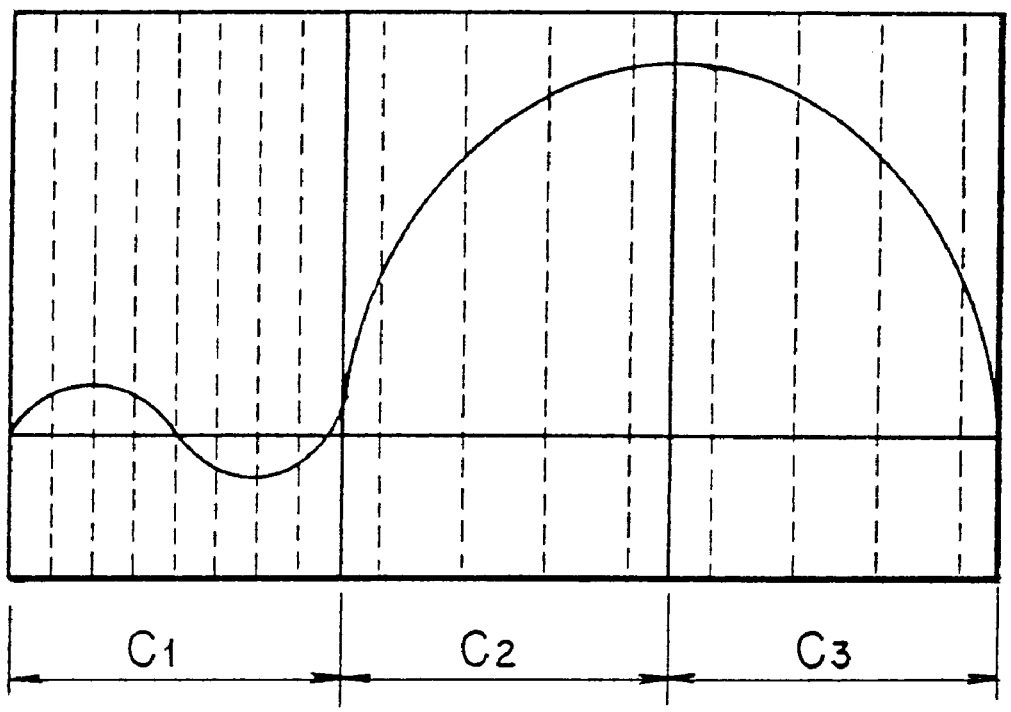
FIG. 10 is a diagram showing a filter characteristic of a timing phase control filter portion according to the embodiment.

Meanwhile, as shown in FIG. 10, the impulse response characteristic may be a cosine-squared characteristic. The timing phase control filter portion 125A having such a filter characteristic also has a characteristic serving as a roll off filter.

Further, the filter processing coefficient determining portion 125B determines coefficients $C_1$ to $C_3$ used for the filter processing in the timing phase control filter portion 125A depending upon 12 low order bits of the timing phase information (PHAD) from the decimation processing portion 124, and information about an approximate expression of the cosine-squared impulse response characteristic as shown in FIG. 10.

In addition, the coefficient operation start position determining portion 125C determines the operation start position (center position) of the coefficient operation in the filter processing of the timing phase control filter portion 125A depending upon 2 high order bits of the timing phase information (PHAD) from the decimation processing portion 124.

In this case, the 2 high order bits among 14 bits forming the timing phase information show in which of four areas obtained by dividing a range of −360° to +360° at 180 degree intervals the phase is. Twelve low order bits among the 14 bits forming the timing phase information show in which of $2^{12}$ (4096) areas obtained by further equally dividing one of the four areas divided at 180 degree intervals the phase is.

That is, the coefficient operation start position determining portion 125C determines the operation start position depending upon the 2 high order bits of the timing phase information, and the filter processing coefficient determining portion 125B determines the coefficients $C_1$ to $C_3$ used for the filter processing by using the 12 low order bits.

Figure 9:
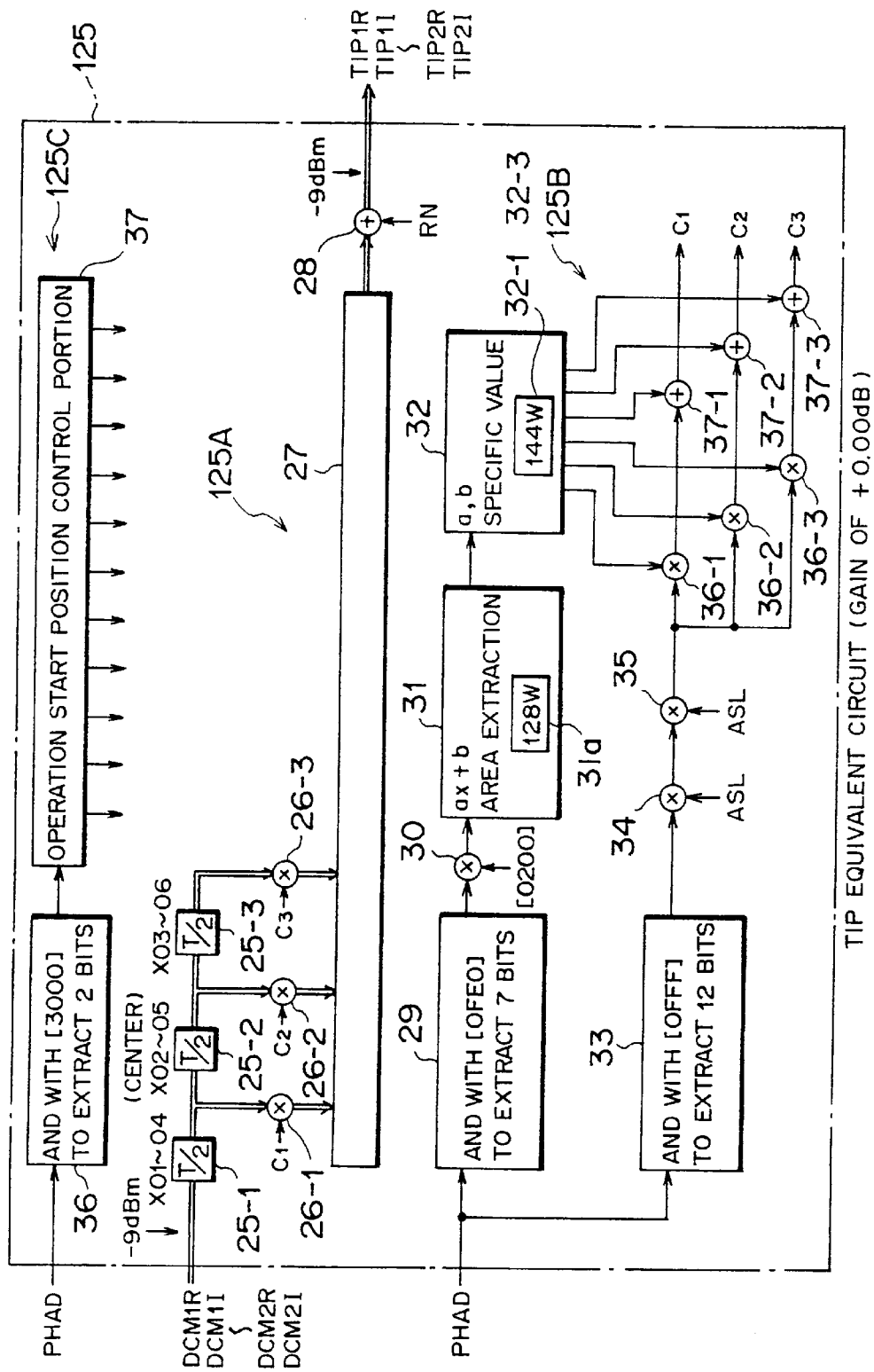
FIG. 9 is a diagram showing an essential part of the timing phase control apparatus according to the embodiment.

Here, as shown in FIG. 9, the timing phase control filter portion 125A is provided with a three-stage transversal filter including taps 25-1 to 25-3, coefficient multipliers 26-1 to 26-3, and a total sum calculating portion 27, and a rounding portion 28.

Thereby, the signals (DCM1R, DCM1I, DCM2R, and DCM2I) from the decimation processing portion 124 are sequentially held in the taps 25-1 to 25-3, and are multiplied in the coefficient multipliers 26-1 to 26-3 by the coefficients $C_1$ to $C_3$ held in the taps 25-1 to 25-3. Thereafter, the total sum calculating portion 27 calculates a total sum of output from the coefficient multipliers 26-1 to 26-3. Moreover, the rounding portion 28 rounds off an output signal from the total sum calculating portion 27.

Further, the filter processing coefficient determining portion 125B extracts a coefficient of a linear functional equation (linear approximate expression) from the timing phase information (7 high order bits among the 12 low order bits), thereafter calculating and determining the coefficients $C_1$ to $C_3$ for a filter having the cosine-squared filter characteristic as shown in FIG. 10 according to a linear approximate expression having the extracted coefficient with the timing phase information (the 12 low order bits) as a parameter. It is thereby possible to eliminate the need for storage of the coefficients $C_1$ to $C_3$ themselves.

For this purpose, the filter processing coefficient determining portion 125B includes a 7 bits extracting portion 29, a multiplier 30, an area extracting portion 31, an approximate expression coefficient storage portion 32, a 12 bits extracting portion 33, bit shift portions 34, 35, multipliers 36-1 to 36-3, and adders 37-1 to 37-2.

The 7 bits extracting portion 29 executes AND operation between the timing phase information (PHAD, 14 bits) from the timing extract/control portion 126 and a hexadecimal number [0FE0], thereby extracting 7 high order bits among the 12 low order bits. The multiplier 30 performs bit shift processing by multiplying the 7-bit information extracted in the 7 bits extracting portion 29 by a value [0200].

Depending upon the timing phase information (7 bits) input from the multiplier 30, the area extracting portion 31 decides in which of 128 areas obtained by equally dividing a range from 0° to 180° the phase information is. The area extracting portion 31 includes an area decision table 31a in which area decision information corresponding to the timing phase information is stored.

That is, the area extracting portion 31 can decide the area of the timing phase information by referring to the area decision table 31a depending upon the timing phase information from the timing extract/control portion 126, and the area decision information serving as a decision result is output to the approximate expression coefficient storage portion 32 at a subsequent stage.

Therefore, the 7 bits extracting portion 29, the multiplier 30, and the area extracting portion 31 can serve as a phase information area deciding portion to decide the area of the timing phase information input from the timing extract/control portion 126.

Figures 21, 22:
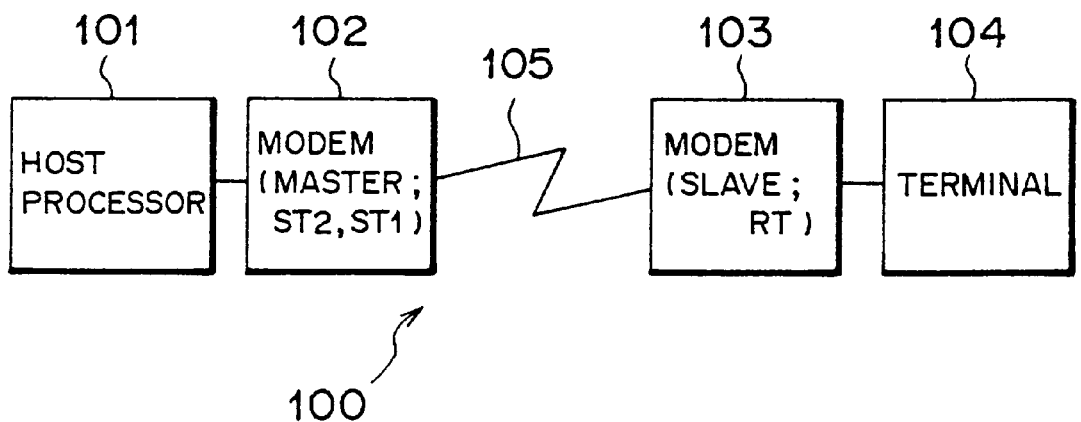
FIG. 21 is a diagram explaining an effect of the timing phase control apparatus according to the embodiment.
FIG. 22 is a block diagram showing one illustrative system for data communication through a modem.
Figure 23:
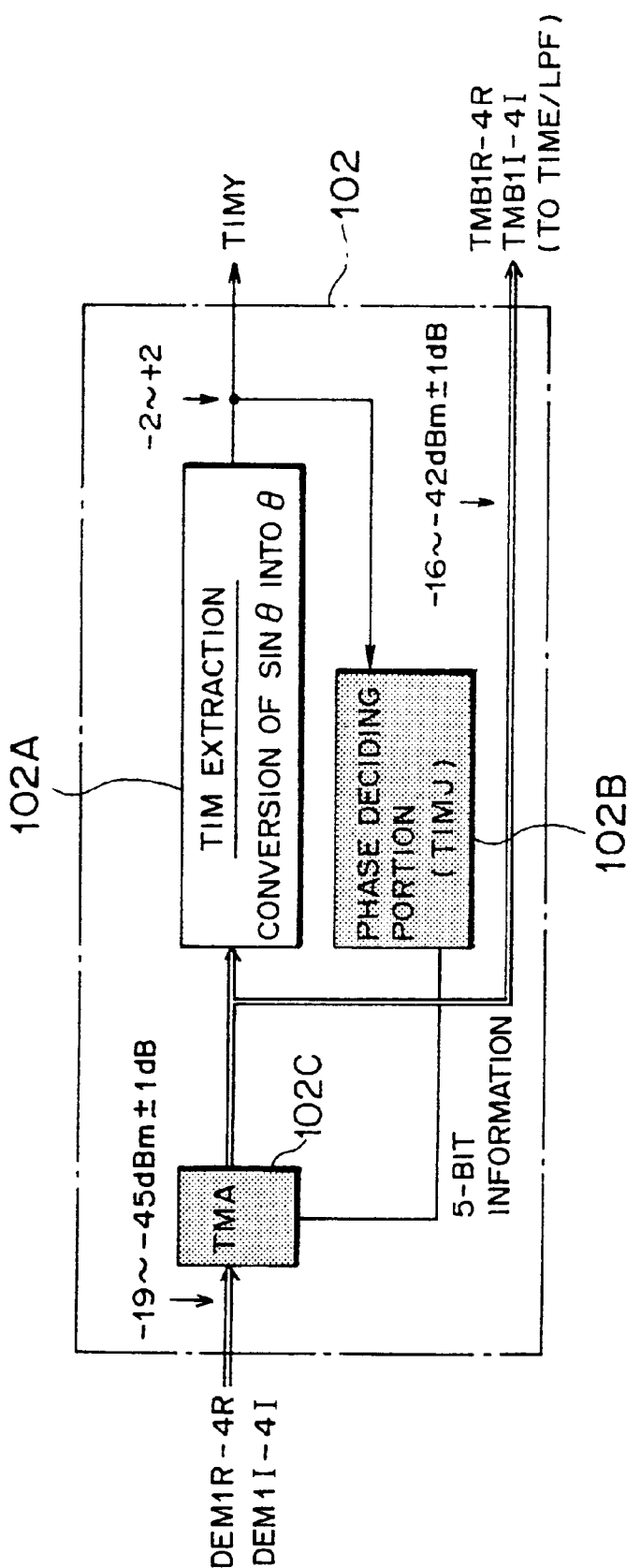
FIG. 23 is a diagram showing a configuration of a master modem in the data communication system shown in FIG. 22.

Moreover, the area decision table 31a contains address information of 128 words (see FIG. 21).

Further, for each of the areas specified by the decision in the area extracting portion 31, in the approximate expression coefficient storage portion 32 is stored coefficient information of the linear functional equation serving as the approximate expression to calculate the coefficient information ($C_1$ to $C_3$) which can provide a filter characteristic having a desired impulse response characteristic. The approximate expression coefficient storage portion 32 includes approximate expression coefficient tables 32-1 to 32-3 to respectively determine the filter coefficients $C_1$ to $C_3$.

That is, the approximate expression coefficient tables 32-1 to 32-3 serve as a coefficient storage table in which a coefficient of the approximate expression of the impulse response characteristic is stored as table data for each of the plurality of areas corresponding to phase decision results in the area extracting portion 31.

That is, as shown in FIGS. 11 to 13, the approximate expression coefficient table 32-1 to determine the filter coefficient $C_1$ contains a gradient a and an intercept b (both of which are 16-bit information) as coefficient information of each of the 128 areas obtained by equally dividing the range of 180°.

Similarly, the approximate expression coefficient table 32-2 to determine the filter coefficient $C_2$ contains, for each of 256 equal areas, a gradient a and an intercept b as shown in FIGS. 14 and 15. The approximate expression coefficient table 32-3 to determine the filter coefficient $C_3$ contains, for each of the 256 equal areas, a gradient a and an intercept b as shown in FIGS. 16 and 17.

Thereby, the area extracting portion 31 can extract the address information used to refer to the approximate expression coefficient storage portion 32 from the 7-bit information from the multiplier 30. The address information permits selection of the gradient a and the intercept b of the approximate expression (linear functional equation) to determine the coefficients $C_1$ to $C_3$ from the respective approximate expression coefficient tables 32-1 to 32-3.

That is, the approximate expression coefficient storage portion 32 extracts the coefficient of the approximate expression by referring to the approximate expression coefficient tables 32-1 to 32-3 depending upon the phase decision result from the area extracting portion 31. As a result, the approximate expression coefficient storage portion 32 serves as a coefficient information extracting portion to extract information about the coefficient of the approximate expression depending upon the phase decision result from the area extracting portion 31.

Moreover, in the approximate expression coefficient tables 32-1 to 32-3 shown in FIGS. 11 to 17, the area divided into the 128 pieces is shown as the area divided by 256 points (serial numbers "0" to "255"; addresses [0000] to [00FF]) positioned at regular intervals.

Additionally, the approximate expression coefficient table 32-1 contains coefficient information of 76 words, the approximate expression coefficient table 32-2 contains coefficient information of 38 words, and the approximate expression coefficient table 32-3 contains coefficient information of 38 words (see FIG. 21).

Further, the 12 bits extracting portion 33 executes AND operation between the timing phase information (PHAD, 14 bits) from the timing extract/control portion 126 and a hexadecimal number [0FFF], thereby extracting 12 low order bits. The bit shift portions 34, 35 respectively perform bit shift processing of the 12-bit information extracted in the 12 bits extracting portion 33.

Further, the multipliers 36-1 to 36-3 respectively multiply the timing phase information of which the bit shift processing are performed in the bit shift portions 34, 35 by the gradient a selected from the approximate expression coefficient tables 32-1 to 32-3. The adders 37-1 to 37-3 respectively add a value obtained by multiplication of the gradient a in the multipliers 36-1 to 36-3 to the intercept b selected from the approximate expression coefficient tables 32-1 to 32-3.

That is, with the timing phase information (12 low order bits) of which the bit shift processing are performed in the bit shift portions 34, 35 as a parameter (for example, x), the multiplier 36-1 and the adder 37-1 can approximately calculate the filter coefficient $C_1$ in the timing phase control filter portion 125A according to the following linear approximate expression:

$$f(x)=ax+b$$

Similarly, the multiplier 36-2 and the adder 37-2 can approximately calculate the filter coefficient $C_2$ according to an operation of a linear function, and the multiplier 36-3 and the adder 37-3 can approximately calculate the filter coefficient $C_3$ according to an operation of a linear function.

In other words, the multipliers 36-1 to 36-3 and the adders 37-1 to 37-3 serve as a filter processing coefficient calculating portion to calculate the coefficient used for the filter processing in the timing phase control filter portion 125A by using the approximate expression coefficient extracted in the approximate expression coefficient storage portion 32, and the 12 low order bits of the timing phase information.

Meanwhile, since the filter coefficient is calculated by using the 12-bit timing phase information as the parameter, it is possible to calculate a tap coefficient with accuracy (of $180°/4096$) obtained by dividing a range of $180°$ into $2^{12}$ (=4096) pieces with respect to the timing phase information.

Figure 18A:
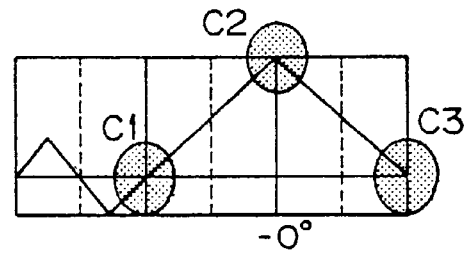
FIGS. 18(a) to 18(c) are diagrams respectively showing a filter coefficient determined in a filter processing coefficient determining portion according to the embodiment.

Moreover, in the timing phase control filter portion 125A, the tap coefficients $C_1$ to $C_3$ for a $-0°$ phase control may take values as indicated by shadings in FIG. 18(a) according to the impulse response characteristic. In this case, 12-low-order-bit timing phase information becomes [0000] (see FIG. 19).

Figure 18B:
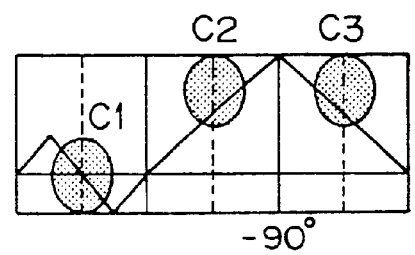
Figure 18C:
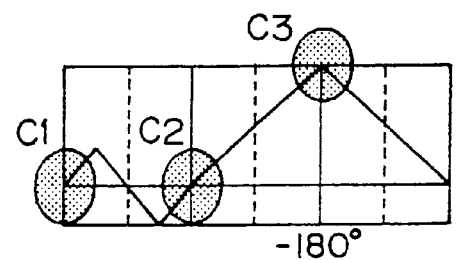

Similarly, the tap coefficients $C_1$ to $C_3$ for a $-90°$ phase control may take values as indicated by shadings in FIG. 18(b) (12-low-order-bit timing phase information being [0800]), and the tap coefficients $C_1$ to $C_3$ for a $-180°$ phase control may take values as indicated by shadings in FIG. 18(c) (12-low-order-bit timing phase information being [0FFF]).

Meanwhile, specifically, the coefficient operation start position determining portion 125C includes a 2 bits extracting portion 36 and an operation start position control portion 37.

Here, the 2 bits extracting portion 36 executes AND operation between the timing phase information (PRAD, 14 bits) from the decimation processing portion 124 and a hexadecimal number [3000], thereby extracting 2 high order bits.

Further, the operation start position control portion 37 controls the operation start position in the timing phase control filter portion 125A depending upon the 2 high order bits of the timing phase information from the 2 bits extracting portion 36.

Symbol information X01 to X04 are held in the tap 25-1 of the timing phase control filter portion 125A in the order in which the symbol information is input. In the same order, symbol information X02 to X05 are held in the tap 25-2, and symbol information X03 to X06 are held in the tap 25-3 (serial numbers "01" to "06" being given to the symbol information X in the order from most to least recent).

Depending upon the 2 high order bits of the timing phase information, the coefficient operation start position determining portion 125C decides from which of the symbol information X04 to X06, the symbol information X03 to X05, the symbol information X02 to X04, and the symbol information X01 to X03 the filter processing should be started.

Specifically, as shown in FIG. 19, when the 2 high order bits of the timing phase information is "11" ([3] in the hexadecimal system), the center position serving as the operation start position is set to a position to provide a $-180°$ phase shift (rightmost position), thereby performing the filter processing from the symbol information X04 to X06.

Further, when the 2 high order bits of the timing phase information is "10" ([2] in the hexadecimal system), the center position serving as the operation start position is set to a position to provide a $-0°$ phase shift (second position from the rightmost position), thereby performing the filter processing from the symbol information X03 to X05.

Further, when the 2 high order bits of the timing phase information is "01" ([1] in the hexadecimal system), the center position serving as the operation start position is set to a position to provide a $+180°$ phase shift (third position from the rightmost position), thereby performing the filter processing from the symbol information X02 to X04.

Further, when the 2 high order bits of the timing phase information is "00" ([0] in the hexadecimal system), the center position serving as the operation start position is set to a position to provide a $+360°$ phase shift (leftmost position), thereby performing the filter processing from the symbol information X01 to X03.

A description will now be given of an operation of one embodiment of the present invention, having the configuration described above.

Figure 20:
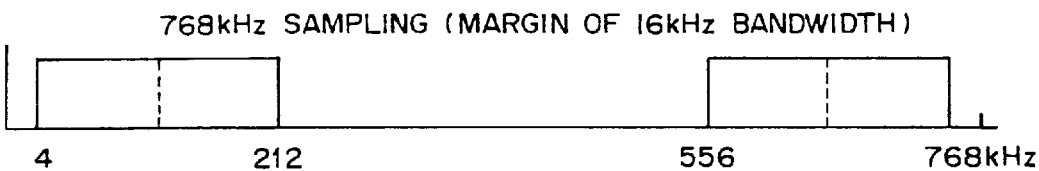
Figure 20:
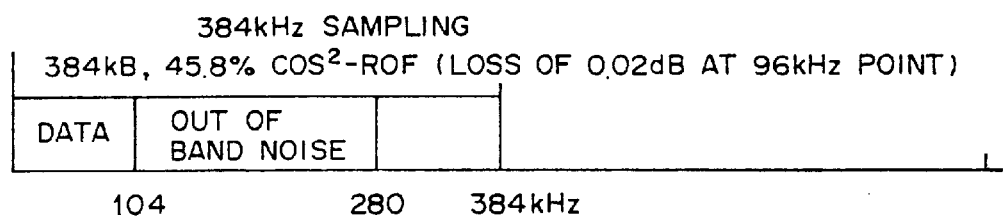
Figure 20:
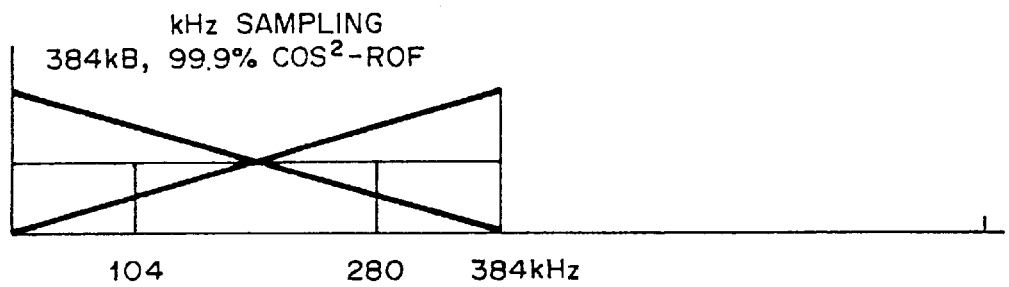
Figure 20:
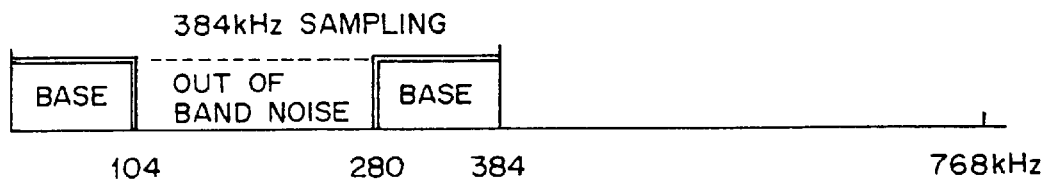

That is, as shown in FIG. 2, the transmit signal from the terminal 14 is transmitted through the modem 13 and the metallic line 15, and is received by the modem 12 (see, for example, a frequency spectrum shown in FIG. 20(a)).

The modem 12 performs required receive interface processing (see reference numerals 121 to 132 in FIG. 3) to send a result to the host processor 11. Specifically, signal processing such as demodulation, and decimation processing are made to the receive signal (see, for example, a frequency spectrum shown in FIG. 20(b)). Thereafter, the timing phase control filter 125 performs, for example, the filter processing for the timing phase control (see a filter characteristic of FIG. 20(c), and see a filter processing result of FIG. 20(d)).

In the interface processing of the receive signal in the modem 12, the timing phase control is made by the timing phase control filter portion 125A as shown in FIG. 9 through the digital filter processing having the impulse response characteristic as shown in FIG. 10 with the signal from the decimation processing portion 124 as an input signal.

Further, the operation start position and the filter coefficient for the timing phase control filter portion 125A are determined depending upon the 14-bit timing phase information (PHAD) extracted from the input signal in the timing extract/control portion 126.

That is, the coefficient operation start position determining portion 125C determines the operation start position (center position) in the timing phase control filter portion 125A by using the 2 high order bits of the timing phase information from the timing extract/control portion 126.

In addition, the filter processing coefficient determining portion 125B calculates and determines the coefficients $C_1$ to $C_3$ used for the filter processing in the timing phase control filter portion 125A by using the 12 low order bits of the timing phase information.

The coefficients $C_1$ to $C_3$ are filter coefficients for the filter processing having the impulse response characteristic as shown in FIG. 10. However, coefficients (gradient a and intercept b) for linear approximate expressions to calculate the coefficients $C_1$ to $C_3$ are extracted from the approximate expression coefficient tables 32-1 to 32-3 depending upon data (of 128 words) obtained by address translation of the 7 high order bit phase information among the 12 low order bits of the timing phase information in the area extracting portion 31.

Thereby, the multipliers 36-1 to 36-3 and the adders 37-1 to 37-3 calculate the coefficients $C_1$ to $C_3$ used for the filter processing in the timing phase control filter portion 125A by using the extracted coefficients a and b of the linear approximate expression to calculate the coefficients $C_1$ to $C_3$, and the 12 low order bits of the timing phase information as a parameter.

Further, with the operation coefficients $C_1$ to $C_3$ calculated in the filter processing coefficient determining portion 125B, the digital filter processing is performed from the operation start position determined in the coefficient operation start position determining portion 125C. It is thereby possible to perform the filter processing for the timing phase control of the decimation output serving as the input signal.

Meanwhile, the area decision table 31a contains the address information of 128 words, the approximate expression coefficient table 32-1 contains coefficient information of 76 words, the approximate expression coefficient table 32-2 contains coefficient information of 38 words, and the approximate expression coefficient table 32-3 contains coefficient information of 38 words. As a result, when the timing phase control is made by using the timing phase information with a 12-bit accuracy, a total table capacity of 272 words is required.

Figure 24:
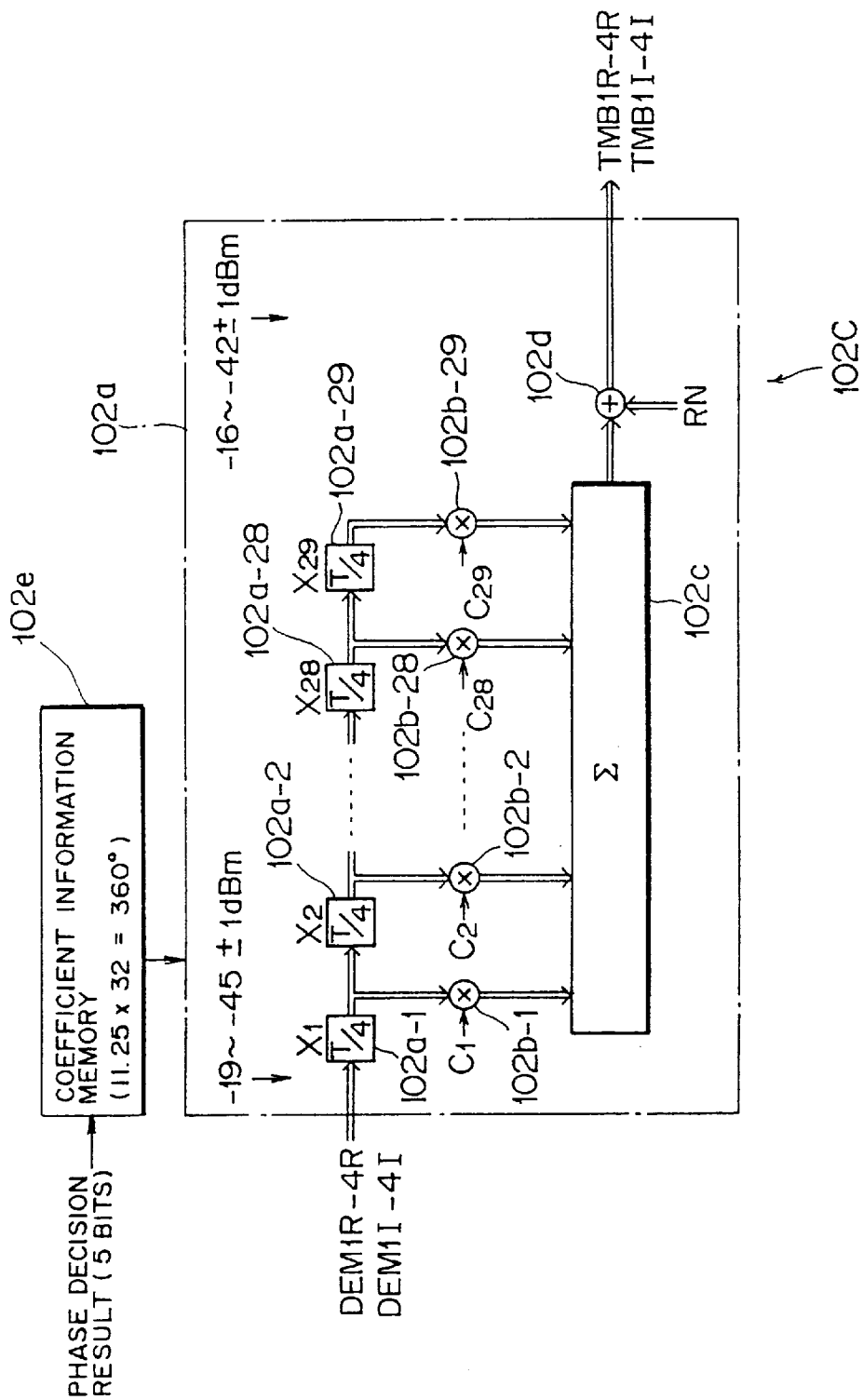
FIG. 24 is a diagram showing an essential configuration of the master modem in the data communication system shown in FIG. 22.

On the other hand, if the filter is configured according to a filter 102C shown in FIG. 24 to make the timing phase control depending upon the timing phase information with the 12-bit accuracy, a table capacity of 4096 words is required for each of the operation coefficients $C_1$ to $C_3$, resulting in a total table capacity of 12288 words.

That is, according to the timing phase control apparatus of the embodiment, unlike the filter configured according to the filter 102C shown in FIG. 24, the need for storage of all the filter coefficients can be eliminated. Consequently, it is sufficient to store a small amount of information to calculate the filter coefficient according to the linear approximate expression. It is thereby possible to considerably reduce a capacity for a ROM (Read Only Memory) forming the table.

As set forth above, according to the embodiment of the present invention, the timing extract/control portion 126 extracts the timing phase information from the decimation output serving as the input signal, and the filter processing coefficient determining portion 125B determines the coefficient used for the filter processing in the timing phase control filter portion 125A depending upon the timing phase information and the information about the approximate expression of the impulse response characteristic. The timing phase control filter portion 125A can thereby perform the filter processing through the operation using the coefficient determined as stated above. Therefore, the need for storage of all the filter coefficients can be eliminated. Consequently, it is sufficient to store the small amount of information to calculate the filter coefficient according to the linear approximate expression. As a result, there are one advantage in that the available capacity for the ROM (Read Only Memory) forming the table can considerably be reduced, and an additional advantage in that an accuracy of the tap coefficient can be improved while reducing an amount of information about the tap coefficient, which should be stored.

While the preferred embodiment of the present invention has been described using specific terms and values, such description is for illustrative purpose only, and it is to be understood that variations and modifications may be made without departing from the spirit or scope of the following claim.

What is claimed is:

1. A timing phase control apparatus comprising:
   a timing phase extracting section for extracting timing phase information from an input signal;
   a timing phase control filter section for performing a timing phase control on the input signal based on the extracted timing phase information from said timing phase extracting section through a filtering process using a coefficient operation, said timing phase control filter section having a predetermined impulse response characteristic; and
   a filtering process coefficient determining section for determining a coefficient to be used for the filtering process in said extracted timing phase control filter section based on said extracted timing phase information and also information about a gradient a and an intercet b of a linear approximate expression f(x)=ax+b of said impulse response characteristic of said tiring phase control filter section.

2. A timing phase control apparatus according to claim 1, wherein the timing phase control filter portion includes a transversal filter.

3. A timing phase control apparatus, comprising:
   a timing phase extracting section for extracting timing phase information from an input signal;
   a timing phase control filter section for performing a timing phase control on the input signal based on the extracted timing phase information from said timing phase extracting section through a filtering process using a coefficient operation, said timing phase control filter section having a predetermined impulse response characteristic; and
   a filtering process coefficient determining section for determining a coefficient to be used for the filtering process in said extracted timing phase control filter section based on said extracted timing phase information and also information about an approximate expression of said impulse response characteristic of said timing phase control filter section,
   wherein the filter processing coefficient determining portion comprises:
      a phase information area deciding portion to decide an area of the tiring phase information input from the timing phase extracting portion;
      a coefficient information extracting portion to extract information about the coefficient of the approximate expression depending upon a phase decision result from the phase information area deciding portion; and
      a filter processing coefficient calculating portion to calculate the coefficient used for the filter processing by using the approximate expression coefficient extracted in the coefficient information extracting portion, and the timing phase information.

4. A timing phase control apparatus according to claim 3, further comprising a coefficient storage table in which a coefficient of an approximate expression of the impulse response characteristic is stored as table data for each of a plurality of areas corresponding to phase decision results in the phase information area deciding portion, wherein the coefficient information extracting portion extracts the coefficient of the approximate expression depending upon the phase decision result from the phase information area deciding portion by referring to the coefficient storage table.

5. A timing phase control apparatus according to claim 3, further comprising an area decision table in which area decision information corresponding to the timing phase information is stored, wherein the phase information area deciding portion decides an area of the timing phase information depending upon the timing phase information from the timing phase extracting portion by referring to the area decision table.

6. A timing phase control apparatus, comprising:

a timing phase extracting section for extracting timing phase information from an input signal;

a timing phase control filter section for performing a timing phase control on the input signal based on the extracted timing phase information from said timing phase extracting section through a filtering process using a coefficient operation, said timing phase control filter section having a predetermined impulse response characteristic;

a filtering process coefficient determining section for determining a coefficient to be used for the filtering process in said extracted timing phase control filter section based on said extracted timing phase information and also information about an approximate expression of said impulse response characteristic of said timing phase control filter section; and a coefficient operation start position determining portion to determine an operation start position of the coefficient operation in the filter processing depending upon the timing phase information.

7. A timing phase control apparatus according to claim 6, wherein the coefficient operation start position determining portion determines the operation start position depending upon a high order bit of the timing phase information, and the filter processing coefficient determining portion determining the coefficient used for the filter processing by using a low order bit of the timing phase information.

8. A timing phase control apparatus, comprising:

a timing phase extracting section for extracting timing phase information from an input signal;

a timing phase control filter section for performing a timing phase control on the input signal based on the extracted timing phase information from said timing phase extracting section through a filtering process using a coefficient operation, said timing phase control filter section having a predetermined impulse response characteristic; and a filtering process coefficient determining section for determining a coefficient to be used for the filtering process in said extracted timing phase control filter section based on said extracted timing phase information and also information about an approximate expression of said impulse response characteristic of said timing phase control filter section, wherein the impulse response characteristic in the timing phase control filter portion has a cosine-squared filter characteristic.

9. A timing phase control apparatus comprising:

a timing phase extracting portion to extract timing phase information from an input signal;

a timing phase control filter portion to make a timing phase control to the input signal depending upon the timing phase information from the timing phase extracting portion through filter processing using a coefficient operation having a preset impulse response characteristic;

a filter processing coefficient determining portion to determine a coefficient used for the filter processing in the timing phase control filter portion depending upon a low order bit of the timing phase information and information about a linear approximate expression of the impulse response characteristic; and a coefficient operation start position determining portion to determine an operation start position of the coefficient operation in the filter processing depending upon a high order bit of the timing phase information.

10. A timing phase control method comprising the steps of:

providing a timing phase control filter section for performing a timing phase control on an input signal through a filtering process using a coefficient operation, said timing phase control filter section having a predetermined impulse response characteristic;

extracting timing phase information from said input signal;

calculating an operation coefficient with which said timing phase control is to be performed based on the extracted timing phase information and also information about a gradient a and an intercept b of a linear approximate expression $f(x)=ax+b$ of said predetermined impulse response characteristic of said timing phase control filter section; and performing a filtering process for the timing phase control of the input signal through a coefficient operation using the calculated operation coefficient.

* * * * *